United States Patent [19]

Frankel et al.

[11] Patent Number: 4,805,087
[45] Date of Patent: Feb. 14, 1989

[54] SELECTIVE MICROFICHE DISPLAY EQUIPMENT

[75] Inventors: Hugh Frankel; Ginette Sauve-Frankel, both of Keene, N.Y.; Christian Aubut, St. Eustache, Canada

[73] Assignee: Q & L Corp., Inc., Willsboro, N.Y.

[21] Appl. No.: 655,591

[22] Filed: Sep. 28, 1984

[51] Int. Cl.$^4$ ............... G03B 27/47; G06K 7/10; G05D 3/00
[52] U.S. Cl. .................. 364/474.22; 235/462; 353/25; 353/27 R; 353/27 A; 364/518; 364/167.01
[58] Field of Search ............... 235/462, 470; 350/241; 353/25, 27 R, 27 A; 364/518, 167, 171; 315/DIG. 4

[56] References Cited

U.S. PATENT DOCUMENTS

| | | | |
|---|---|---|---|
| 3,267,801 | 8/1966 | Abboty, Jr. et al. | 353/24 |
| 3,324,761 | 6/1967 | Murray et al. | 353/27 R |
| 3,361,031 | 1/1968 | Stroud | 353/27 R |
| 3,373,653 | 3/1968 | Roberts et al. | 355/8 |
| 3,400,631 | 9/1968 | Rauscher | 355/42 |
| 3,528,735 | 9/1970 | Bluitt et al. | 353/27 R |
| 3,671,116 | 6/1972 | Leutwein et al. | 353/27 R |
| 3,720,464 | 3/1973 | Ditscheid | 353/27 R |
| 3,722,991 | 3/1973 | Edhiund | 353/27 R |
| 3,744,891 | 7/1973 | Dennis et al. | 353/27 R |
| 3,754,817 | 8/1973 | Iida et al. | 353/27 R |
| 3,771,863 | 11/1973 | Muka | 353/27 R |
| 3,790,266 | 2/1974 | Ueda et al. | 353/27 R |
| 3,797,925 | 3/1974 | Smitzer | 353/27 R |
| 3,809,468 | 5/1974 | Moritz | 353/27 A X |
| 3,824,009 | 7/1974 | Spaleny et al. | 353/27 R |
| 3,834,799 | 9/1974 | Blesser et al. | 353/27 R |
| 3,841,747 | 10/1974 | Peroutky et al. | 353/27 R |
| 3,853,395 | 12/1974 | Yevick | 353/27 R |
| 3,885,867 | 5/1975 | Nelson et al. | 353/27 R |
| 3,904,285 | 9/1975 | Yanagawa | 353/27 R |
| 3,944,350 | 3/1976 | Yevick | 353/27 R |
| 3,947,102 | 3/1976 | Hofmann et al. | 353/27 A |
| 3,961,846 | 6/1976 | Crew | 353/27 R |
| 3,973,344 | 8/1976 | Frankel | 40/158 B |
| 3,993,405 | 11/1976 | Kinsinger et al. | 353/27 A |
| 3,997,257 | 12/1976 | Wells | 353/27 R |
| 4,015,900 | 4/1977 | Wells | 353/27 R |
| 4,025,177 | 5/1977 | Owens et al. | 353/27 A |
| 4,029,406 | 6/1977 | Sickles | 353/27 R |
| 4,033,684 | 7/1977 | Toriumi et al. | 353/27 A |
| 4,049,342 | 9/1977 | Hearon | 353/27 R |

(List continued on next page.)

OTHER PUBLICATIONS

Smith, *Why and How Smart Trainers are Switching to Micrographics*, Training 30 (May 1978).
"The Automatic", pub. by Information Design Inc. (n.d.).
"If You Use Fiche, Get the Facts About Office Automation," pub. by Information Design Inc. (n.d.).

*Primary Examiner*—Felix D. Gruber
*Attorney, Agent, or Firm*—Heslin & Rothenberg

[57] ABSTRACT

A microprocessor-controlled microfiche viewer which is adaptable for displaying microfiche having any format. The viewer calls up selected microfiche images in either a sequential mode or a random mode. In the sequential mode a carrier table follows a default sequence, and is cued by a keyboard control, by a dual-tone audio cueing signal that is received over a telephone line or from a tape player, or by a digital signal from an RS-232 port. In the random mode, particular images are selected by moving the carrier table in desired directions with directional keys, or by providing the coordinates of an image to the microprocessor. Image coordinates are entered manually at the keyboard, by dual-tone audio signals from a telephone line or a tape player, or by data from the RS-232 port. Means are provided for generating audio tones for recording cue signals on one track of an audio tape while playing back an audio accompaniment pre-recorded on the other channel, in order to synchronize the selection of images with an audio commentary. Also provided are means for holding the microfiche flat in the focal plane of the projection lenses, and a system of marking either the fiche to be viewed or a blank formatting fiche to adapt the viewer to the proper format.

12 Claims, 25 Drawing Sheets

OTHER PUBLICATIONS

| | | | |
|---|---|---|---|
| 4,066,350 | 1/1978 | Koide et al. | 353/27 R |
| 4,074,933 | 2/1978 | Yevick | 353/27 R |
| 4,120,573 | 10/1978 | Johnston et al. | 353/27 A |
| 4,174,891 | 11/1979 | Flint et al. | 353/26 A |
| 4,179,743 | 12/1979 | Suzuki et al. | 364/518 |
| 4,190,899 | 2/1980 | Smith et al. | 364/900 |
| 4,191,455 | 3/1980 | Watanabe et al. | 353/27 A |
| 4,205,387 | 3/1980 | Ovshinsky et al. | 364/900 |
| 4,213,040 | 7/1980 | Gokey et al. | 235/476 |
| 4,223,212 | 9/1980 | Smith et al. | 377/17 |
| 4,225,217 | 9/1980 | Smith | 353/120 |
| 4,254,329 | 3/1981 | Gokey et al. | 235/379 |
| 4,271,439 | 6/1981 | O'Brien | 358/102 |
| 4,283,136 | 8/1981 | Swift et al. | 355/45 |
| 4,287,564 | 9/1981 | Swift et al. | 364/525 |
| 4,315,322 | 2/1982 | Osaki et al. | 364/900 |
| 4,323,906 | 4/1982 | Ohnishi et al. | 346/76 L |
| 4,324,474 | 4/1982 | Kraemer et al. | 355/65 |
| 4,332,466 | 6/1982 | Flasck | 355/27 |
| 4,344,701 | 8/1982 | Klose et al. | 355/51 |
| 4,346,449 | 8/1982 | Ovshinsky et al. | 364/900 |
| 4,348,104 | 9/1982 | Ovshinsky | 355/41 |
| 4,360,265 | 11/1982 | Lewis | 355/43 |
| 4,380,776 | 4/1983 | Smith et al. | 358/102 |
| 4,382,675 | 5/1983 | Marshall | 355/70 |
| 4,408,287 | 10/1983 | Parisot et al. | 364/518 |
| 4,420,232 | 12/1983 | Mischenko | 353/25 |
| 4,420,234 | 12/1983 | Dolejsi et al. | 353/122 |
| 4,427,292 | 1/1984 | Buchanan | 355/54 |
| 4,432,618 | 2/1984 | Parker et al. | 353/25 |
| 4,440,478 | 4/1984 | Mischenko et al. | 353/25 |
| 4,441,061 | 4/1984 | Yoshida et al. | 318/329 |
| 4,443,858 | 4/1984 | Piaton | 364/518 |
| 4,452,518 | 6/1984 | Di Gianfilippo et al. | 353/25 |
| 4,453,822 | 6/1984 | Lewis | 355/43 |
| 4,465,349 | 8/1984 | Rinn et al. | 353/25 |
| 4,470,675 | 9/1984 | Di Gianfilippo et al. | 353/25 X |
| 4,529,281 | 7/1985 | DeRoche et al. | 353/27 A |
| 4,549,797 | 10/1985 | Sawano et al. | 353/27 A |

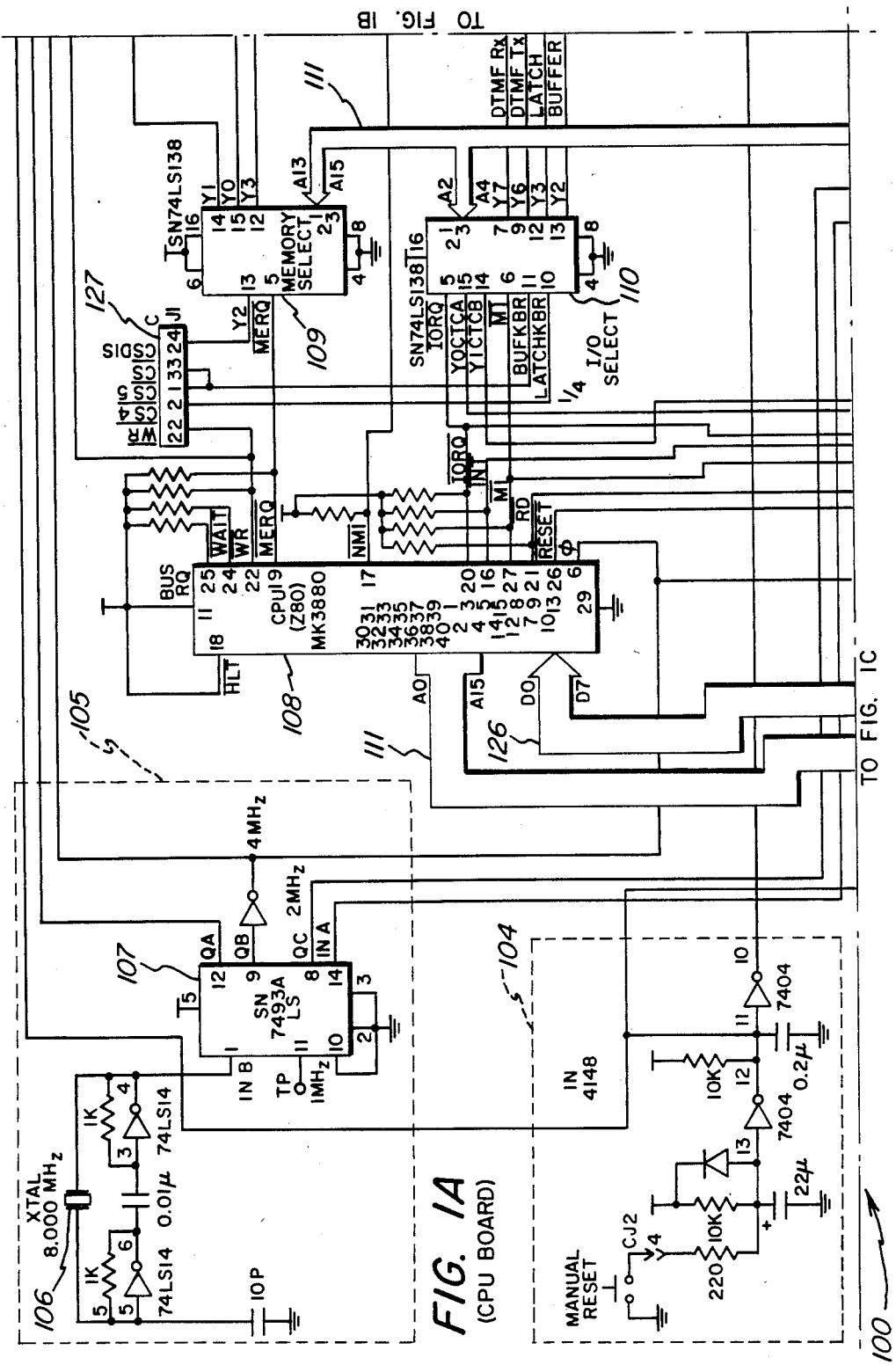
FIG. 1A (CPU BOARD)

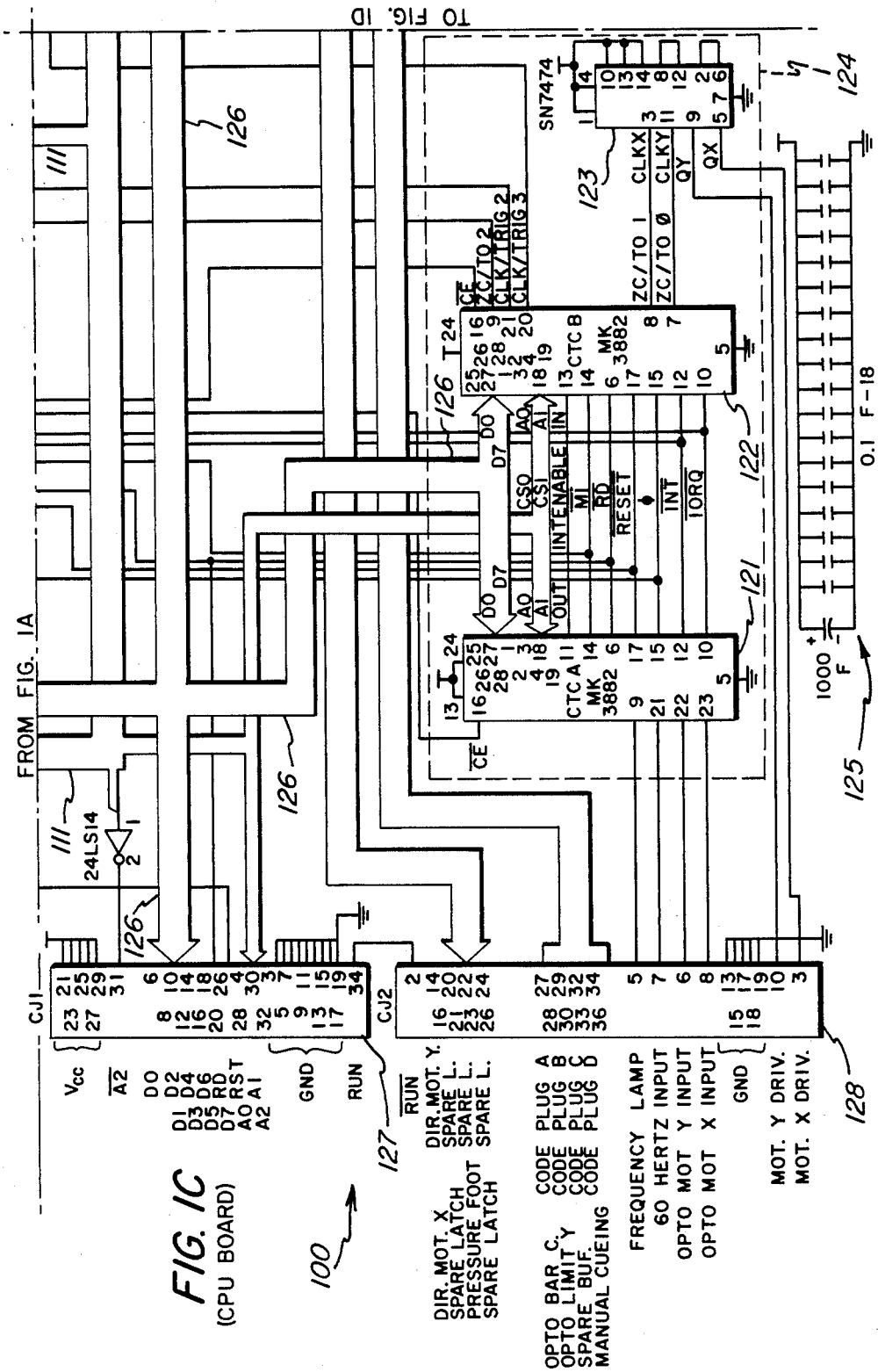

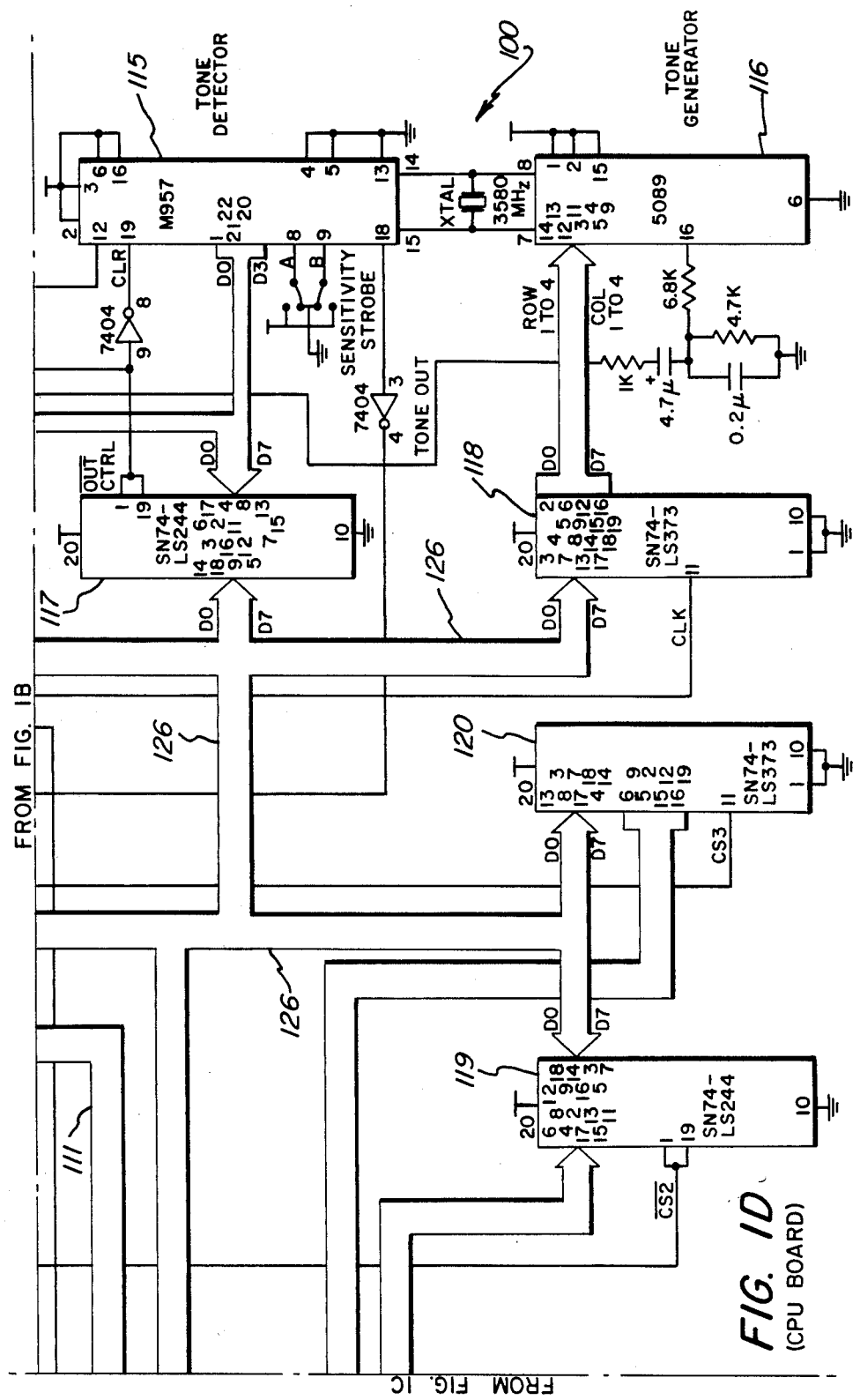
FIG. 1D (CPU BOARD)

(OPTO INTERFACE)

FIG. 5 (KEY BOARD)

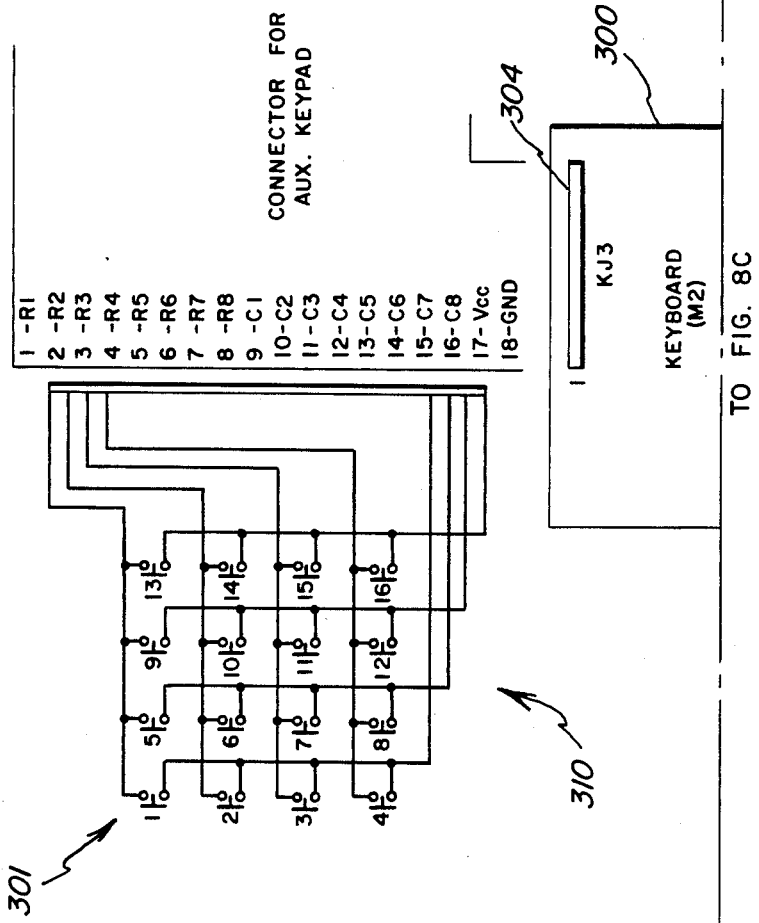

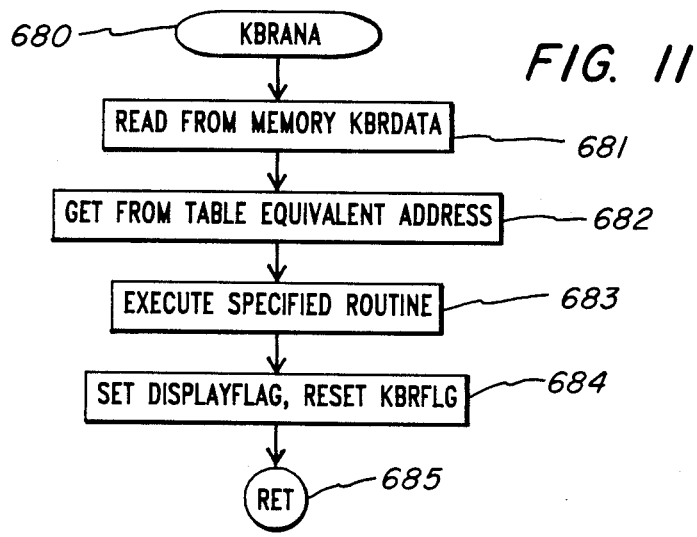
FIG. 11
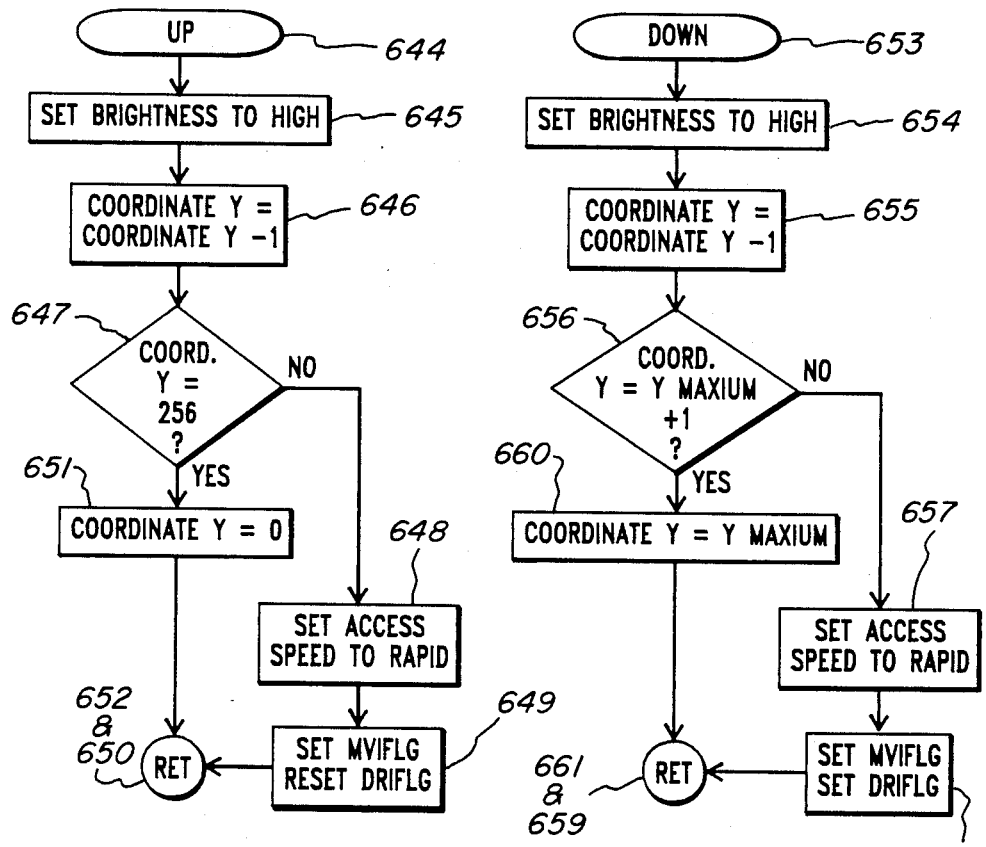
FIG. 12
FIG. 13

FIG. 32
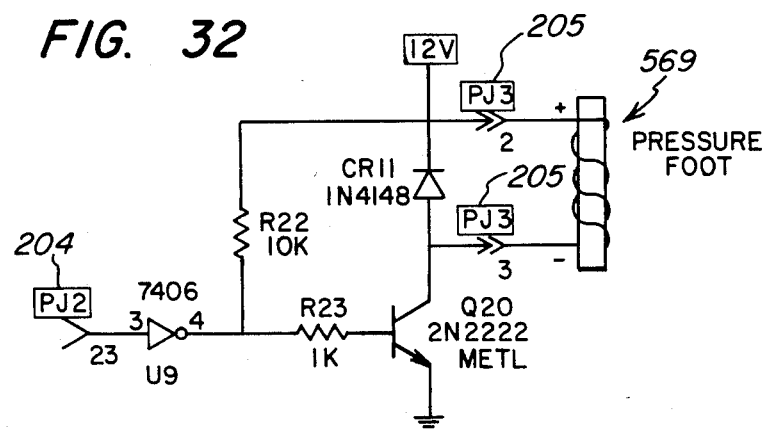
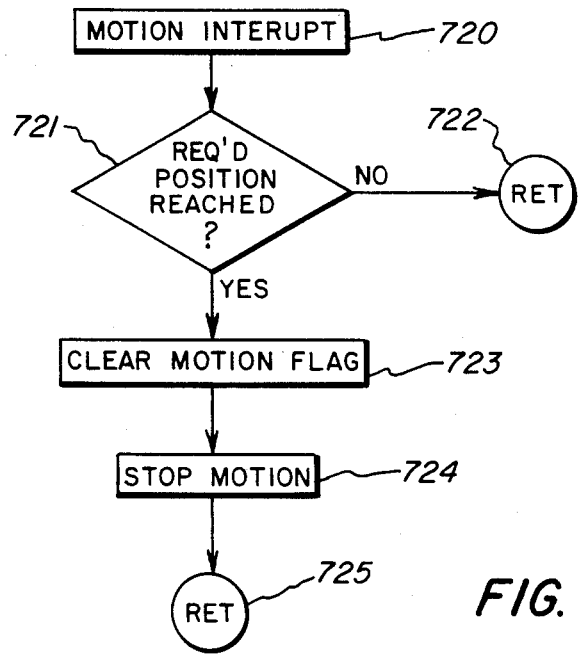
FIG. 33

SELECTIVE MICROFICHE DISPLAY EQUIPMENT

MICROFICHE APPENDIX

A microfiche appendix, hereby incorporated by reference into this specification, is included herewith. The appendix comprises a source code listing of the CPU program described in detail herein.

BACKGROUND OF THE INVENTION

1. Field of the Invention

This invention relates to a microfiche viewer. It relates more particularly to a microprocessor-controlled multi-mode viewer that can display selected microfiche images either sequentially or in random mode, including cueing and programming means for selection of images to be viewed.

2. Description of Related Art

Prior microfiche viewing and reading equipment generally requires the operator to place a microfiche between two sheets of glass in a movable X-Y carrier for manual positioning of images on a viewing screen. Generally, a manually changeable index card is provided for use with each microfiche format, and is positioned on such equipment in order to give the operator some imperfect guidance as to where to manually direct the X-Y carrier in order to place the desired image in viewing position on the screen. Such methods have up to now been the predominant available systems for random access retrieval of information stored on microfiche. With the explosive growth of new forms of microfiche-based information, such as computer-generated documents, copies of documents from word-processors, and recently-developed high-resolution color photographic microfiche for audio-visual presentations and color map and chart retrieval systems, such equipment is inadequate for precise image placement and image presentation in a rapid, efficient manner.

In the field of visual and audio-visual equipment using conventional 35 mm or 2×2 slides and filmstrips, prior art equipment is generally bulky and slow in operation. The use of such equipment in random modes would be difficult and slow because of the essentially fixed sequential nature of these visual systems.

OBJECTS AND SUMMARY OF THE INVENTION

Accordingly, it is a feature of the present invention to provide an imaging system that can accommodate many formats of microfiche in color or black and white, and can precisely position each of a desired selection of images on a viewing screen automatically through manual, recorded or computer-generated cues.

The viewer will primarily be for use with microfiche having the standard microfiche film format (105×148 mm) as determined by ANSI and NMA. However, because microfiche formats have not been standardized to one particular format, but rather are available in a variety of formats, each requiring a different magnification for viewing, it is desirable to provide means for automatically adapting the viewer to all formats to be encountered. This may be accomplished by incorporating a bar code and column centering lines that are photographically printed in the header area of the microfiche to adapt the viewer to the format to be used. Alternatively, the bar code and center lines may be printed photographically on a blank microfiche for use with microfiche without a preprinted header. Optical means are provided for reading the bar code and centering lines as the microfiche is inserted into the viewer. Further means responsive to the bar code may then move a lens turret into position to select the correct magnification of the microfiche image, and other means may set the correct lamp brightness and other relevant parameters.

According to further aspects of the invention, such an apparatus consists of a fiche carrier table having a viewing opening extending in the Y direction. Integral rollers physically transport the microfiche in the X direction from its entry point on one side of the apparatus through a sensor placed at the center of the viewing opening. The sensor scans and reads the entire bar code on the header portion at the top of the fiche and generates a code for the microprocessor as to the format of the array of columns and rows on the fiche. The programmed ROM (read-only-memory) that forms part of the electronic circuitry is programmed with data representative of all formats anticipated to be encountered; even fiche having a combination of different formats can be fed into the apparatus and the microprocessor automatically adapts its operation according to each different format.

The rollers and carrier table are driven by motors with internal optical means which feed back digital pulses to the microprocessor. Additional digital information is generated by the optical sensor that reads the column markers on the fiche, printed in the header area, as the fiche is passed between the sensor and a light source. The column markers locate the center of each image. Comparison of digital information fed back from the header sensor and information derived from the motor pulses results in precise positioning of each image at its exact center. The narrow-angle resolution sensor that reads the center marks is positioned on the front side of the fiche carrier table, centered between its ends, and directly above the slot through which the fiche is viewed.

The images, in any column and row format, are precisely positioned on a viewing screen in either sequential or random mode, either manually, in a default sequence, or in a preselected order recorded on a magnetic tape. Such modes can also be selected by an external computer and fed through as RS-232 interface on the viewer.

In sequential mode the viewer follows a default sequence, in which it displays the fiche images in an S-pattern starting at one corner of the fiche (image A-1 or "home"). Cueing in sequential mode can be either by keyboard control, or by dual-tone cueing signals that are received over a telephone line, or recorded on one channel of a tape in coordination with an audio accompaniment recorded on the other channel. An RS-232 port is provided as an alternate input for cueing signals from an external computer.

In the default sequence, when the fiche has been transported to the last image in a given row, the microprocessor causes the carrier to move along its Y axis to move the fiche to the last image in the next row, whereupon the X motor reverses its direction of travel and the fiche travels until the beginning of the row is reached. In this manner, a fiche can be scanned in an S-pattern, resulting in a smooth, effortless visual presentation of photographic images or reading material.

In random mode, the viewer does not follow an electronically programmed default sequence, but rather is addressed and driven by external signals, i.e., manual signals, signals on magnetic tape, remote control signals, or the like, which specify either a desired image location on the microfiche, or else a direction in which the microfiche is to be moved.

Elements of sequential mode and random mode may be combined in the input to the viewer. If only a dual-tone CUE signal is received, the viewer displays the next image in the default sequence. If dual-tone signals indicating an image location precede the CUE signal, then the next image displayed will be the selected image indicated by the location signals. These two types of input may be used alternately to display separated segments of a single microfiche. RS-232 input is handled in the same way.

It is a further feature of this apparatus that the images can be scanned in a fast forward or rapid review mode for search and review. In these modes the default sequence is followed.

It is further feature of this apparatus that a digital indicator shows the operator the location of the image being viewed (i.e., the position of the fiche) at any given moment. In random mode the alphanumeric coordinates are given (A-1, C-4, D-17, etc.). When sequential mode is selected (i.e., to follow the default sequence) the digital counter initially shows the numerical sequence of images: 1, 2, 3, 4, etc. However, a DISPLAY key is available in sequential mode to toggle between the two types of display.

It is further feature of the apparatus that a pressure system, including a transparent pressure foot through which the image is projected, is incorporated at the image plane, so that the fiche image is always held flat between the pressure foot and a glass platen at the focal plane when the motor drives are not in motion. This results in uniform focusing for each image, so that no re-focusing is necessary from image to image.

It is a further feature of this apparatus that the microprocessor controls the intensity of the projection bulb, so that when no image is being displayed, the bulb dims and is not brought to its full brightness until the image to be displayed is in position, in order to avoid viewer discomfort.

It is further feature of this apparatus that when the CUE control is activated a dual-tone signal of predetermined duration is generated. With the appropriate cable and audio jack this cue signal can be recorded on the second track of a standard stereo cassette tape coordinated with an audio-visual program or commentary on the first track. Any stereo cassette player can be incorporated into such apparatus without any need for special record and playback machines. The audio jack can also be connected to a telephone line by an appropriate adapter for use in teleconferencing.

The invention, as well as other objects, features, and advantages thereof, will be understood more fully from the following description of a preferred embodiment, with reference to the appendix and the drawings, in which like reference numerals denote like elements and parts.

BRIEF DESCRIPTION OF THE DRAWINGS

FIGS. 1A–1D together form a schematic diagram of the central processing unit (CPU) and other circuitry on the CPU board of a microfiche viewer according to a preferred embodiment of the invention.

FIGS. 8A–8D together form a schematic diagram showing the interconnections between the CPU board (FIGS. 1A–1D), the power supply board (FIGS. 2A, 2B), the keyboard (FIGS. 5 and 6), the display board (FIG. 7), and associated circuit elements.

FIGS. 9–23 are flow diagrams illustrating the operation of the central processing unit of the viewer.

FIG. 28 is a cross-sectional top view of the lens turret and focusing mechanism of the viewer taken along line 29—29 of FIG. 26, with the lens carriage offset from its position in FIG 26.

FIG. 32 is a schematic diagram of the pressure foot interface of the viewer.

FIG. 33 is a flow diagram illustrating the motion interrupt routine of the CPU.

DETAILED DESCRIPTION OF A PREFERRED EMBODIMENT

Circuits and Controls

FIGS. 1–8 and 31 show the circuitry and controls of the viewer. The circuitry of the viewer is primarily mounted on four circuit boards, which will be referred to herein as the CPU board 100, the power board 200, the keyboard 300, and the display board 400. These terms are used herein for convenience, rather than to precisely define the functions of the components on each board. As is customary an overscore on a signal designator in the schematics indicates the active-low convention, in which the signal is normally high (+5 volts in this device).

Figure 1B:
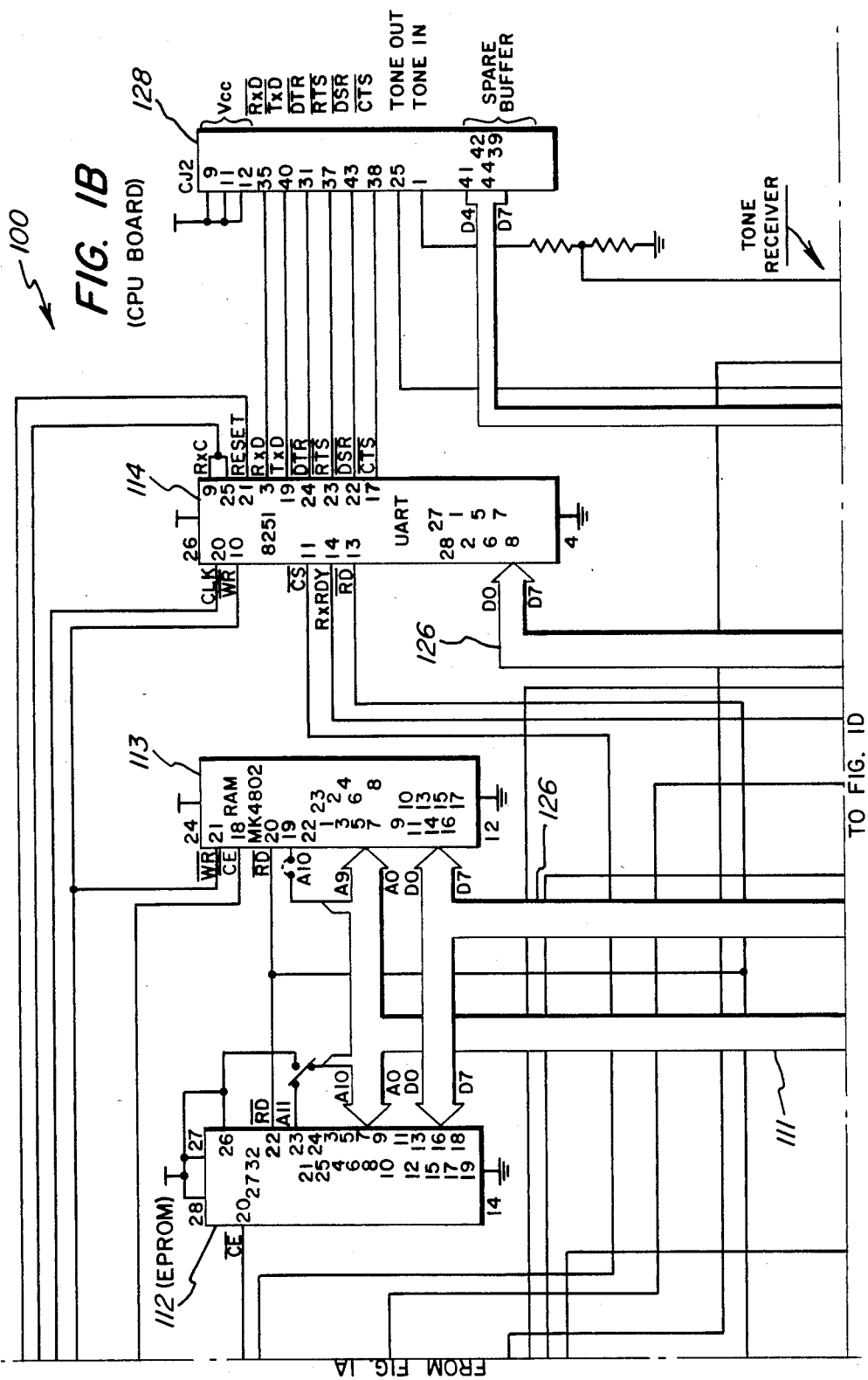

FIGS. 1A–1D are a schematic diagram of the components on the CPU board 100, including the central processing unit (CPU). FIG. 1A shows a clock circuitry 105, a central processing unit (CPU) 108, a memory selected decoder 109, an I/O select decoder 110, and a reset circuit 104. Included in FIG. 1B are an erasable programmable read-only memory (EPROM) 112, a random access memory (RAM) 113, and a universal asynchronous receiver/transmitter (UART) 114. As shown in FIG. 1C, timing and clocking functions are performed by two counter/timer controllers (CTC) designated A and B, which are respectively numbered 121 and 122, in conjunction with a dual flip-flop. These components together comprise a CTC circuit 124. FIG. 1C also shows a group of filter capacitors 125. In FIG. 1D are seen a dual-tone detector 115, a dual-tone generator 116, an audio data buffer 117, an audio data latch 118, a port buffer 119, and a port latch 120.

Referring to FIG. 1A, the clock circuit 105 comprises an 8 MHz crystal 106 and a 4-bit binary counter 107 (SN74LS93A). The latter serves as a frequency divider to produce 50 percent duty-cycle clock signals at 4 MHz and 2 MHz at its pins 9 and 8, respectively. The CPU 108 of the viewer is a 4 MHz Z80A microprocessor, such as the MK3880-4 available from Mostek. An address bus 111 is connected to pins 30-40 and 1-5 of the CPU for addressing memories and other components. Addresses in the memory map of the CPU are divided into ranges according to the three most significant bits (MSB's) to indicate the device that is intended to be addressed. A 3-to-8 memory select decoder 109 (SN74LS138) decodes these bits (bits A13–A15 from pins 3-5 of the CPU) and enables the intended device. The four devices that are enabled by the memory select decoder 109 are the EPROM 112, the RAM 113, the UART 114, and the display 400.

Figure 5:
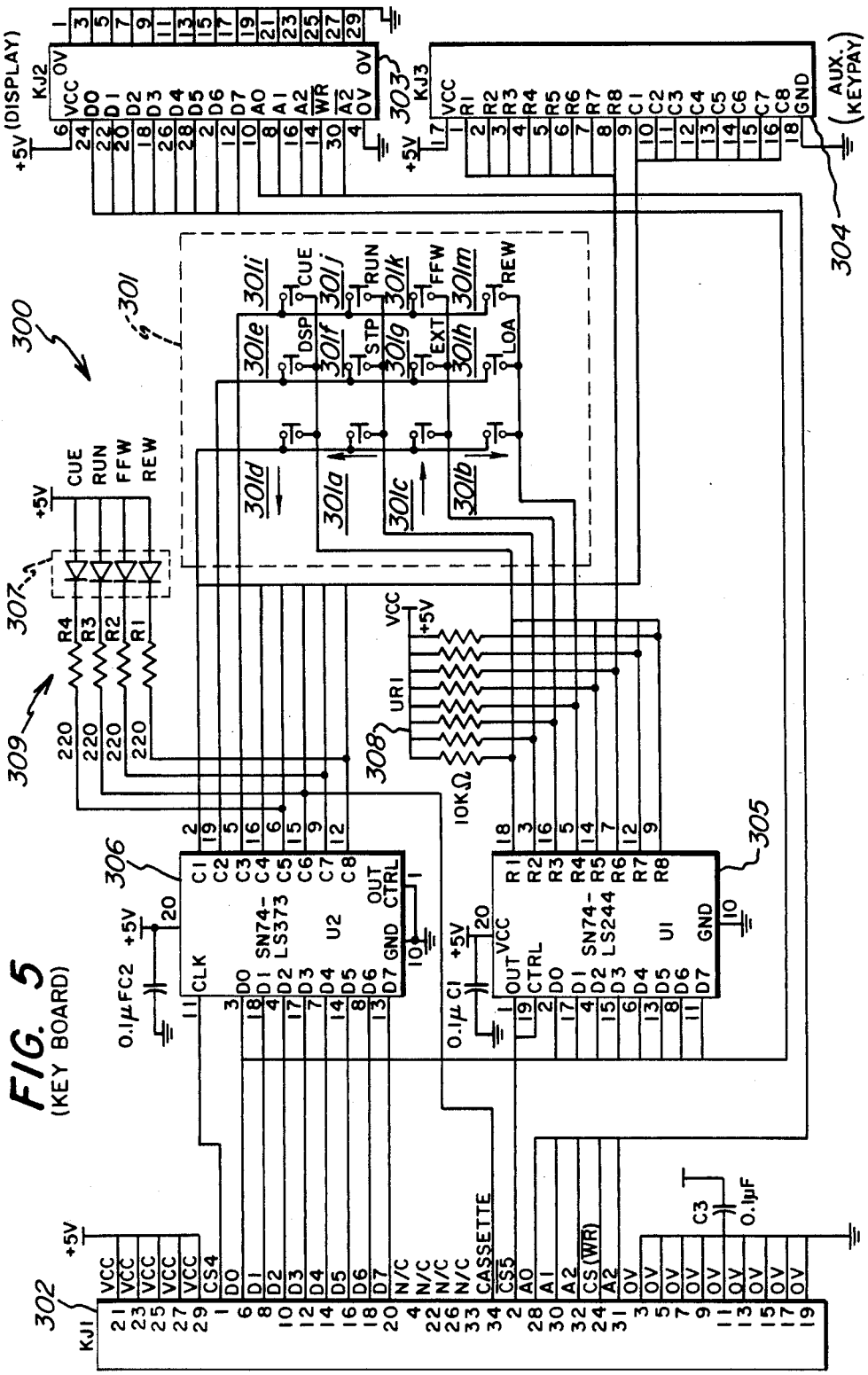
FIG. 5 is a schematic diagram of the keyboard and associated circuitry of the viewer.

A 3-to-8 I/O select decoder 110 (SN74LS138) decodes bits A2–A4 from pins 32-34 of the CPU to select a desired input-output device. The devices that are selected by the I/O select decoder 110 are the CTC-A 121, the CTC-B 122, the port buffer 119, the port latch 120, the audio data buffer 117, the audio data latch 118, and, as seen in FIG. 5, the keyboard latch 306 and the keyboard buffer 305.

The addresses utilized in the above memory-mapped I/O operations are as follows:

TABLE I

| MEMORY SELECT DECODER ADDRESSES | |
|---|---|
| EPROM | 0000H-1FFFH |
| RAM | 2000H-3FFFH |
| DISPLAY | 4000H-5FFFH |
| UART | 6000H-7FFFH |
| I/O SELECT DECODER ADDRESSES | |
| CTC-A | 00H-03H |
| CTC-B | 04H-07H |
| PORT BUFFER | 08H |
| PORT LATCH | 0CH |
| KBR LATCH | 10H |
| KBR BUFFER | 14H |
| AUDIO LATCH | 18H |
| AUDIO BUFFER | 1CH |

The address bus 111 transfers addresses between the CPU 108 and the memory select decoder 109, the I/O select decoder 110, the EPROM 112, the RAM 113, the CTC-A 121, the CTC-B 122, and the display 401.

A data bus 126 transfers data between the CPU 108, the CTC-A 121, the CTC-B 122, the port buffer 119, the port latch 120, the UART 114, the audio data buffer 117, the audio data latch 118, EPROM 112,, RAM 113, a first CPU connector 127 (CJ1), the keyboard buffer 305, the keyboard latch 306, and the display 401.

One filter capacitor 125 is provided adjacent to each of the chips on the CPU board. This purpose is to ground the spikes or transient surges that result from the high-speed switching that occurs during the operation of the present apparatus.

Interconnections between the CPU board and the other circuit boards are made through the first CPU connector 127 (CJ1), referred to as connector 127, and a second CPU connector 128 (CJ2), referred to as connector 128. As seen in FIGS. 8C and 8D, connector 127 is connected to the first keyboard connector 302 (KJ1) and connector 128 is connected to the second power board connector 204 (PJ2).

Figure 8B:
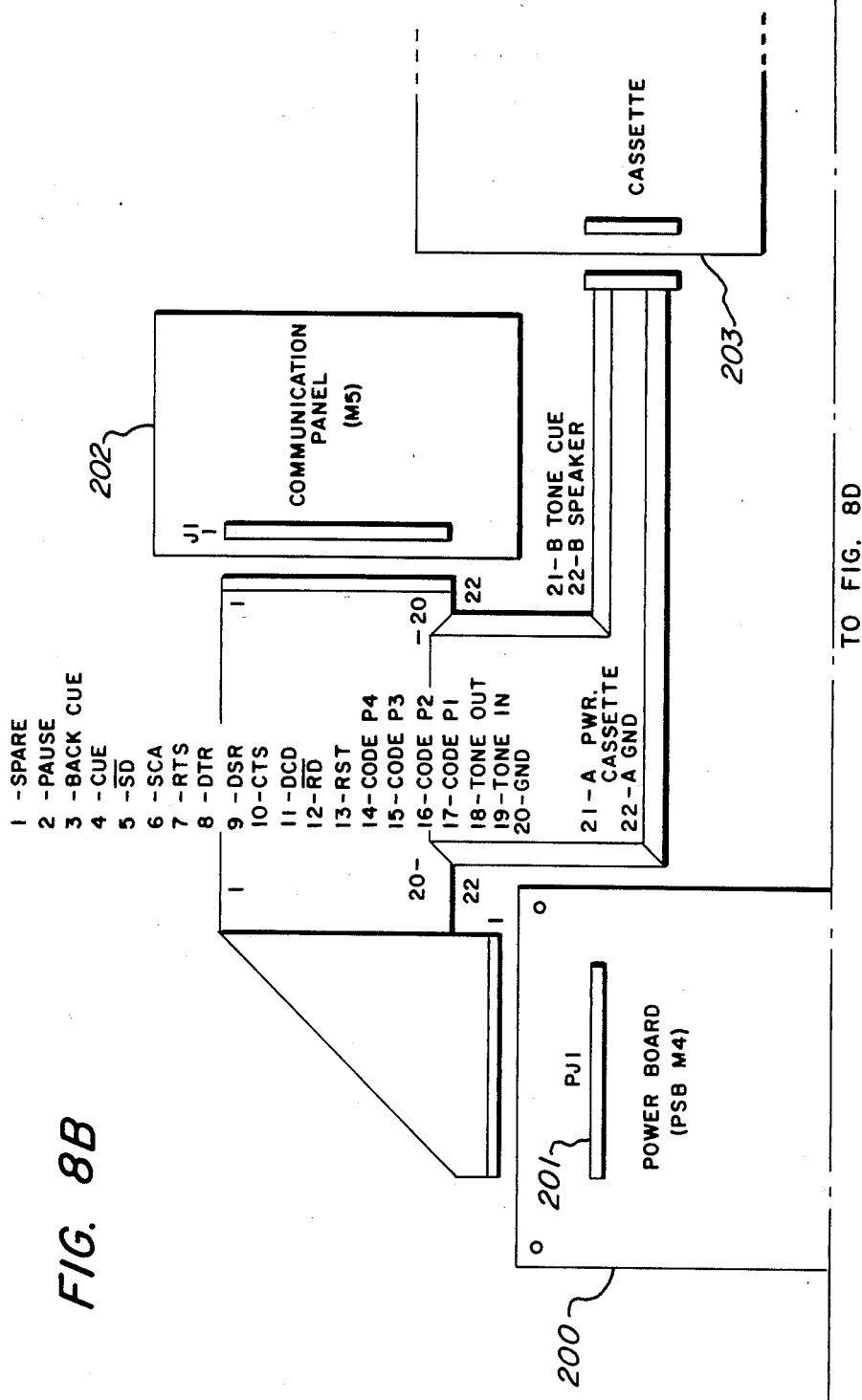
Figure 8C:
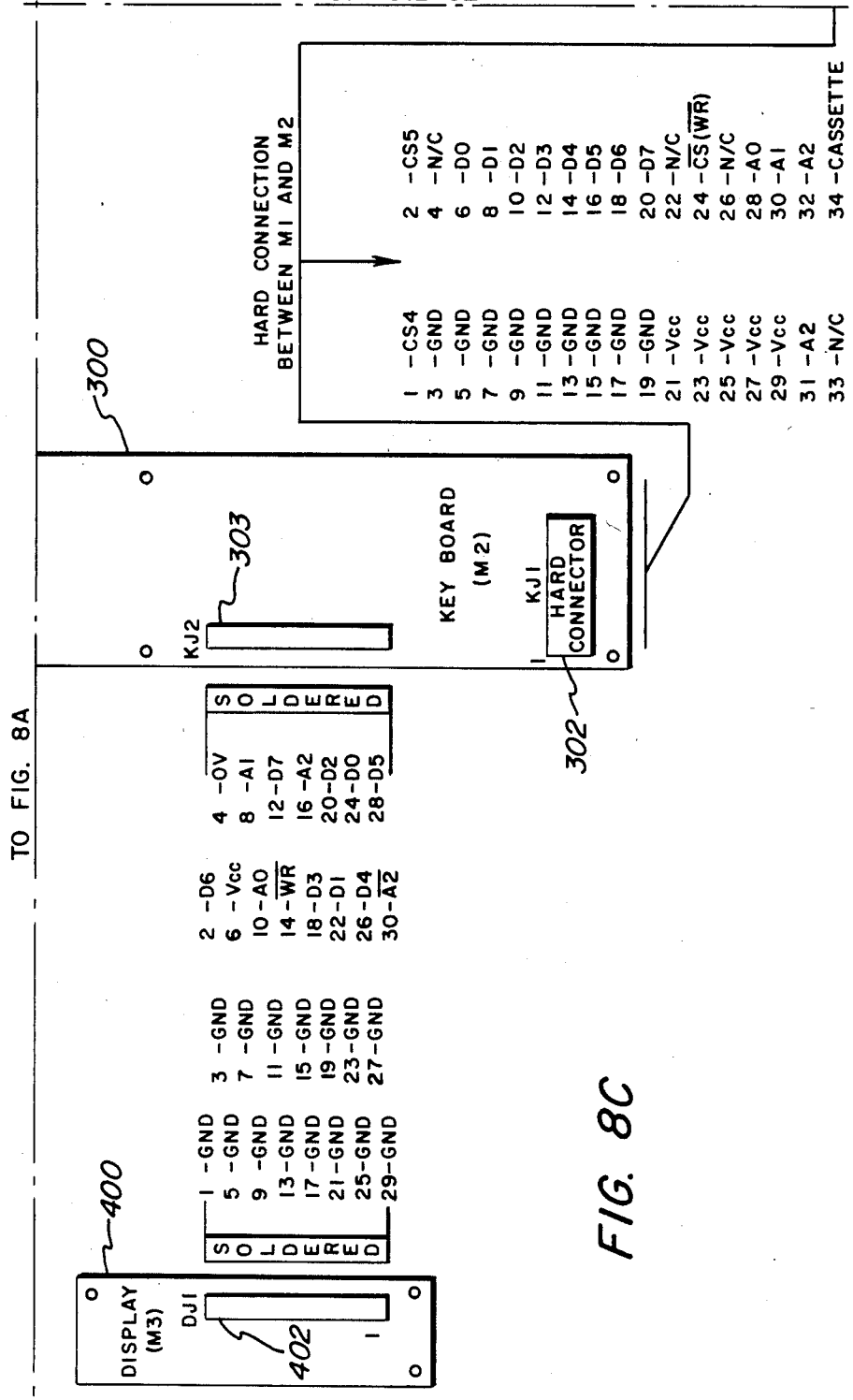
Figure 8D:
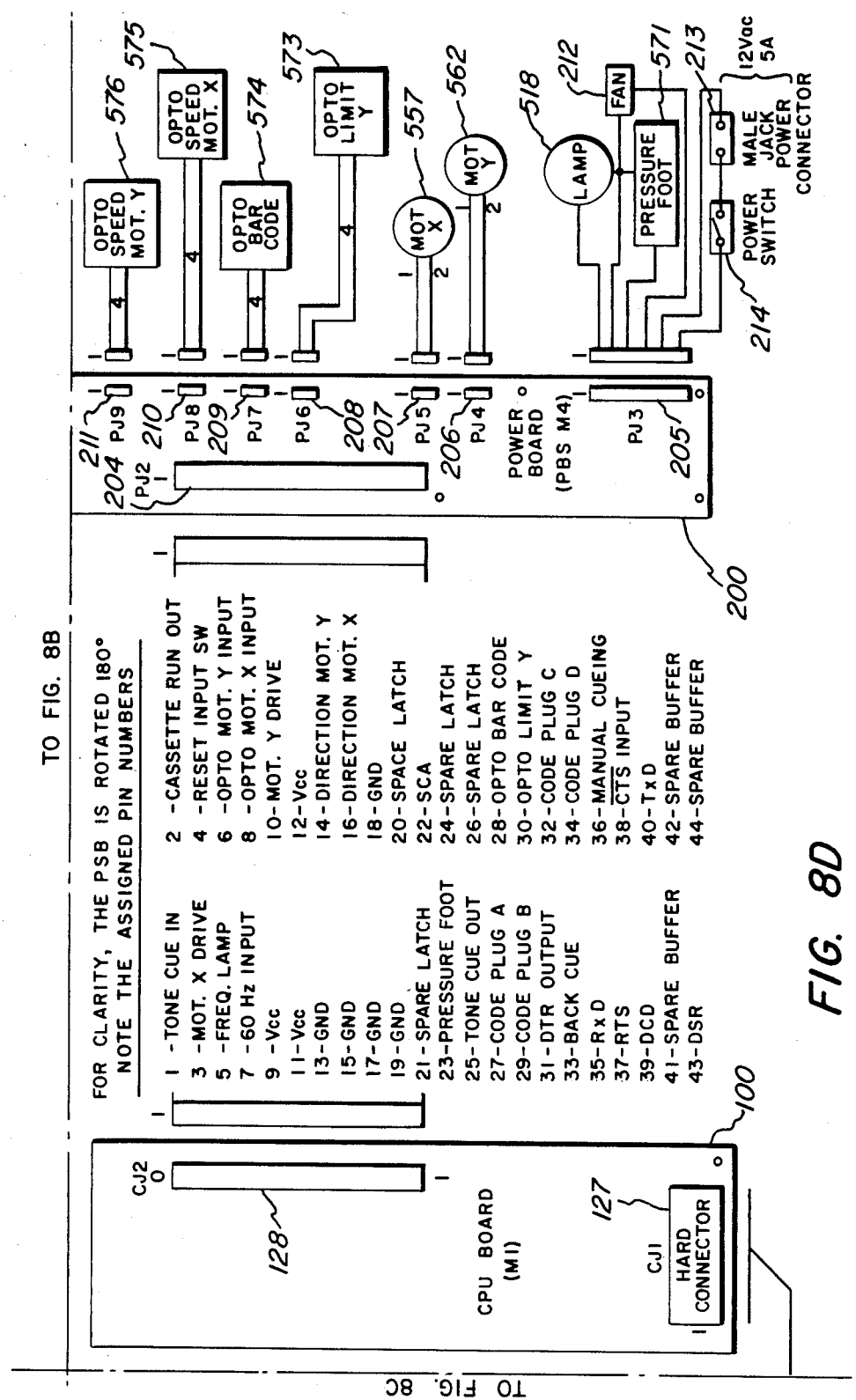

FIGS. 2A, 2B, 3, 4, 8B and 8D show the power board (PSB) 200 of the viewer. Nine connectors are provided for input and output. Connector 201 (PJ1) is connected to a communication panel 202 and a cassette recorder 203. The panel 202 is the interface between the viewer and external components, as follows. Pins 2-4 receive manual forward and back cueing and pause signals from switches or the like. Pins 5-12 receive digital signals from an RS-232 line. Pin 13 receives a reset signal (RST) from a pushbutton switch. Pins 14-17 are connected to DIP switches, referred to in the Figures as "code plugs", which are selectively thrown to select the baud rate of the UART. Pins 18 and 19 are connected to the tone detector 115 and tone generator 116 for respectively transmitting and receiving dual-tone signals between the viewer and a cassette recorder 203, or a telephone line adapter for teleconferencing. Pin 21 of PJ1 delivers 12 VDC to drive the cassette recorder 203, after the RUN key has been pressed. (See FIG. 3.) The cassette recorder may be external or may be mounted within the viewer. Any conventional cassette recorder may be used, such as one designed for automobile use, or the equivalent. As seen in FIG. 8B, the cassette recorder 203 also has two audio outputs at pins 21 and 22 of the panel 202, one for each track of a two-track tape. That is, one output is for tone cue signals to cue the microfiche display, and the other is for connection to a speaker for playing back a commentary or other material related to a microfiche display. The speaker is preferably mounted behind the sound holes 506 in the case 501, See FIG. 24, or if desired it may be external.

Referring to FIG. 8D, a connector 204 (PJ2) interconnects with connector 128 (CJ2) on the CPU board. A connector 205 (PJ3) is connected to the projection lamp 518, the pressure foot solenoid 571, a fan 212, and a connector 213 for a 12 VAC power source, which is in series with a switch 214. A connector 206 (PJ4) is the drive output for the Y motor 562. A connector 207 (PJ5) is the drive output for the X motor 557. The motors 557 and 562 are of the type having an internal optical motion sensor, such as the motor identified as Model No. 44.040, available from Maxon Precision Motors Inc. of Burlingame, Calif. The pressure foot interface is shown in FIG. 32.

Figure 4:
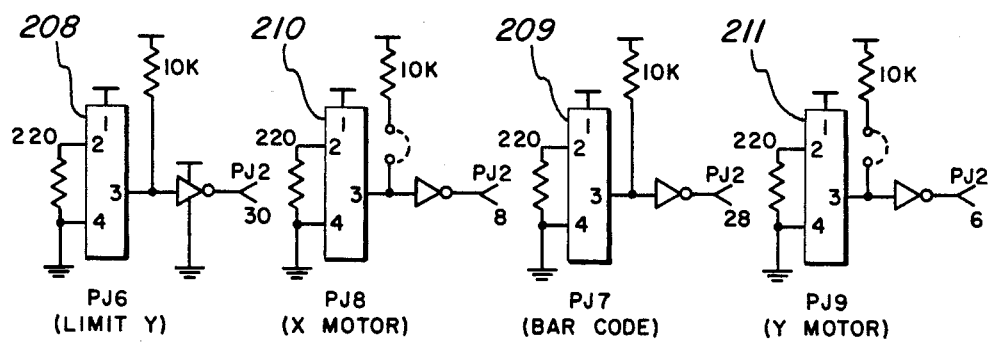
FIG. 4 is a schematic diagram of the photodetector interface circuitry on the power supply board of the viewer.

FIG. 4 shows the four connectors or interfaces, also mounted on the power board 200, for the four optical sensors 573-576 of the viewer. A connector 208 (PJ6) links PJ2 pin 30 to the sensor 573, which detects whether the carrier table 544 is at the rearward limit of its motion in the Y direction, i.e. whether the first row 510 of fiche images is in position for viewing. A connector 209 (PJ7) connects PJ2 pin 28 to the sensor 574, which reads the bar code 514 and the column markers 516. A connector 210 (PJ8) connects PJ2 pin 8 to a sensor 575; and a connector 211 (PJ9) connects PJ2 pin 6 to a sensor 576. The sensors 575 and 576 sense the rotation of the X motor 557 and Y motor 562, respectively.

Figure 2A:
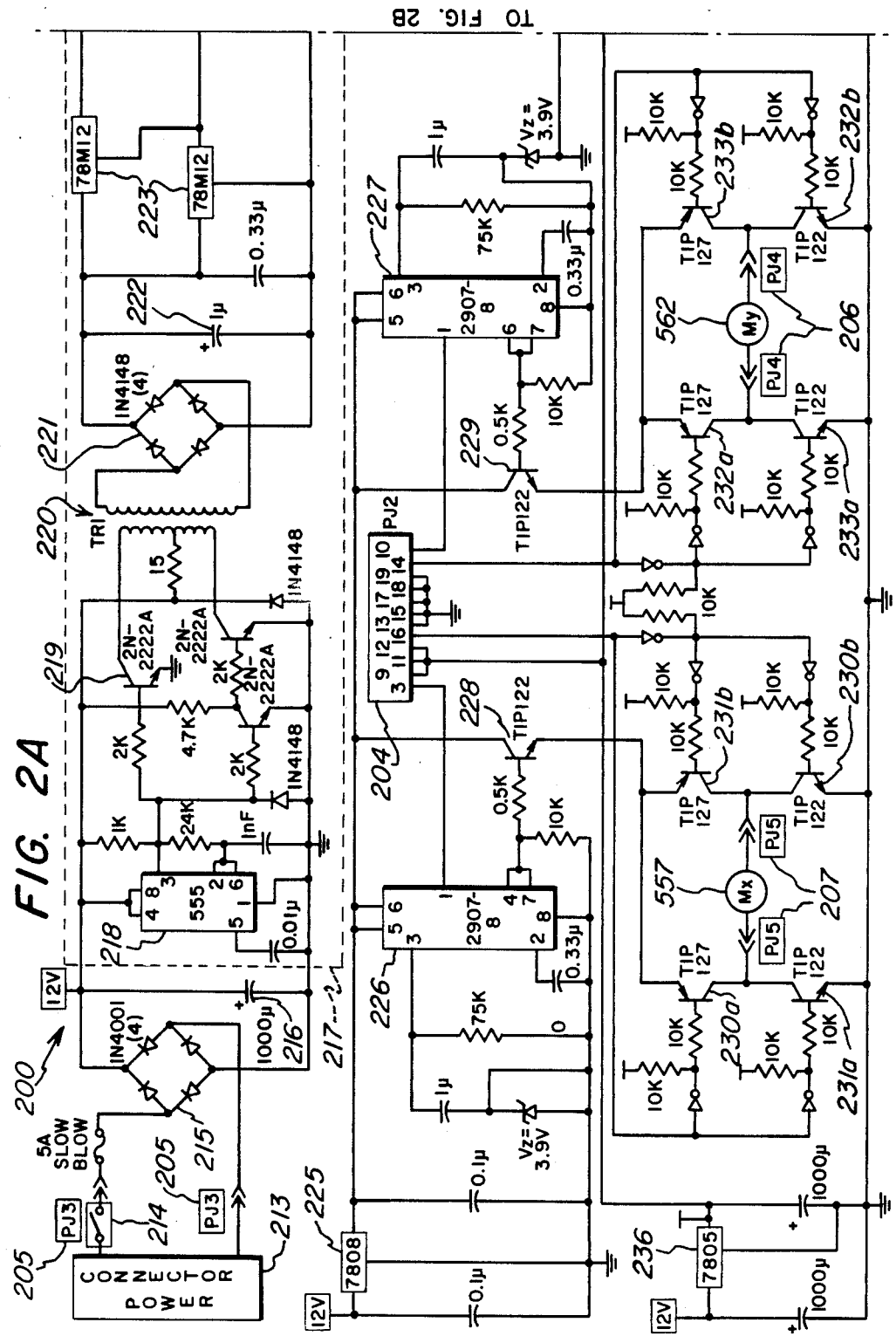
FIGS. 2A and 2B together form a schematic diagram of the power supply circuitry on the power supply board of the viewer.
Figure 2B:
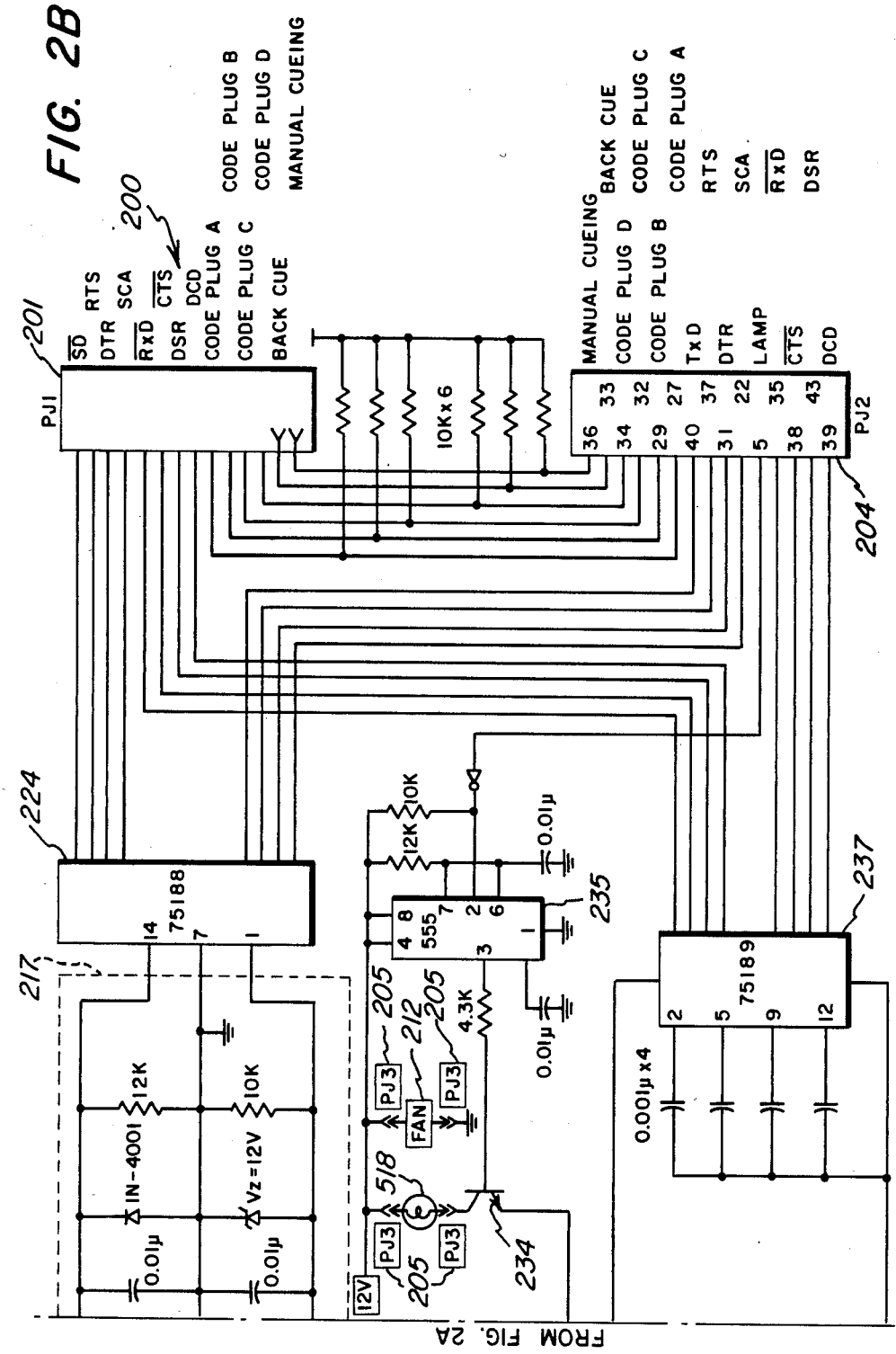
Figure 3:
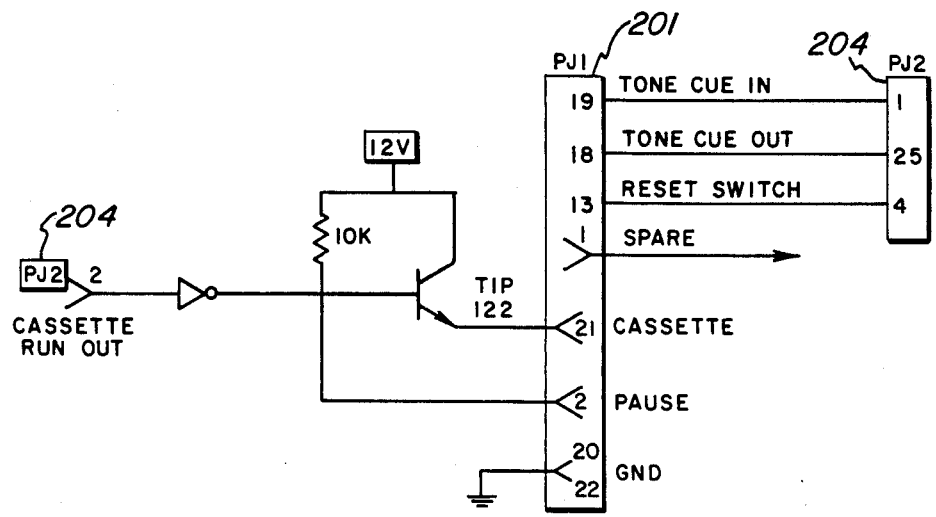
FIG. 3 is a schematic diagram of the cassette interface circuitry on the power supply board of the viewer.

The power board 200 is shown in detail in the schematic diagram in FIGS. 2A and 2B. A 12 VAC power supply is connected to the power connector 213. A full-wave bridge rectifier 215 and a 1000 uf electrolytic filter capacitor 216 produce 12 VDC. This voltage is the input to the power board section numbered 217, which is a DC-to-DC converter. A 20 KHz oscillator 218 (555) switches transistors 219 on and off to produce a 12V square wave signal across the primary of a transformer 220 (TR1), which steps the signal up to approximately 30-35 volts. This signal is then rectified by a full-wave bridge rectifier 221 and filtered by a 1 uf electrolytic capacitor 222. Two cascaded 12-volt regulators 223 (78M12) and further regulating components provide an output of plus and minus 12 VDC, which are the required supply voltages for the RS-232 driver-transmitter 224 (75188). The transmitter 224 receives digital data from the UART 114 and processes it for transmission to external apparatus. An 8-volt regulator 225 (7808) provides supply voltage for two frequency-to-voltage (F/V) converters 226 and 227 (2907-8). The F/V converter 226 is connected to pin 3 of PJ2, where it receives the X output from pin 5 of dual flip-flop 123 on the CPU board 100 and produces a drive signal for the X motor. The input to the F/V converter 226 is a 50 percent duty cycle signal whose frequency corresponds to the DC output voltage required to cause the X motor 557 to move at the desired speed. Similarly, the F/V converter 227 receives the Y output from pin 9 of dual flip-flop 123 via pin 10 of PJ2, and its output is a DC signal whose voltage corresponds to the frequency of the input signal and to the Y motor speed desired. There are substantially three output voltage levels available for the motor drive signals, providing different drive speeds for different modes of carrier table motion: (1) run (slow), (2) fast forward or rapid review (medium), (3) and rapid access by the directional keys, or random access (both fast). The output of F/V converter 226 is delivered to the X motor 557 by an NPN transistor 228, and the output of F/V converter 227 is delivered to the Y motor 562 by an NPN transistor 229.

The polarity of the drive signals is determined by which signal paths are enabled to transmit the drive signals to the motors. The X drive signal can be delivered to the X motor 557 either by a first pair of transistors 230a, 230b, or a second pair 231a, 231b. The Y drive signal is delivered to the Y motor 562 either by a third pair of transistors 232a, 232b, or a fourth pair 233a, 233b. Which of the pairs conducts depends on the state of the X motor direction signal at pin 16 of PJ2 and the Y motor direction signal at pin 14 of PJ2. These signals are received from the port latch 120 on the CPU board. As an example, if the X motor direction signal is high, transistors 230a and 230b conduct and the X motor is driven in one sense. If the signal is low, then transistors 231a and 231b conduct and the X motor is driven in the other sense.

Also seen in FIG. 2B is the ventilating fan 212 and the projection lamp 518, which are both connected to the 12 VDC supply at PJ3. The lamp 518 is driven by a transistor 234 which in turn is driven by a narrow-pulsed output from pin 3 of an oscillator 235 (555). The brightness of the lamp is determined by the pulse rate of transistor 234, thus providing variable brightness. In this way, the lamp can be dimmed as the microfiche is moved between images, to avoid projecting as uncomfortably bright white light on the screen. A low third pulse rate is also provided to keep the lamp filament warm, while generating little or no light. The purpose of this feature is to lengthen the life of the lamp, which can prematurely burn out if subjected to repeated on-off cycles.

Also seen in FIG. 2A is a 5-volt regulator 236, which provides the supply voltage for various digital components, including the RS-232 four-channel receiver 237. The RS-232 receiver receives data signals at connector 201 (PJ1) and produces a digital output to the CPU at connector 204 (PJ2).

Figure 6:
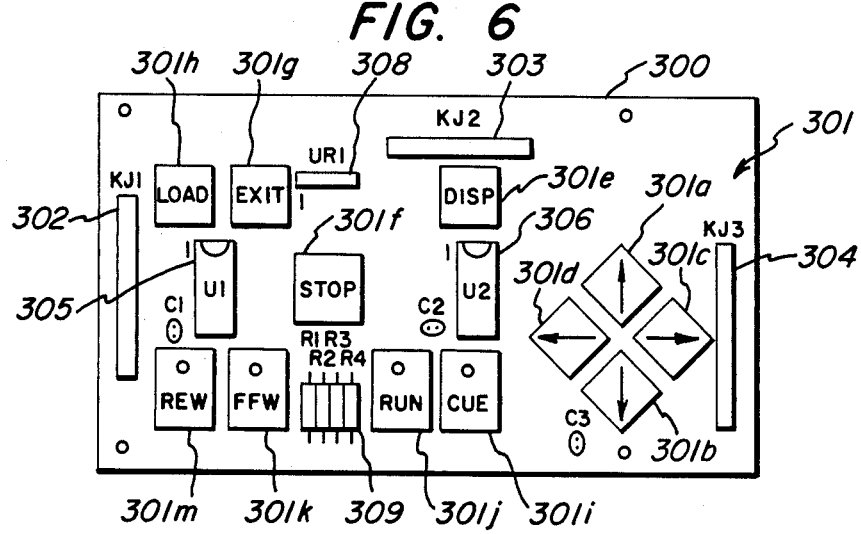
FIG. 6 is a plan view of the circuit board on which the keyboard is mounted.

The keyboard 300 is shown in FIGS. 5 and 6. It contains a main keypad 301 which has 12 keys, whose names and functions are shown in Table II.

TABLE II

| REF. | NAME | FUNCTIONS |
|---|---|---|
| 301a | UP | Move microfiche to view next image in the indicated direction. |
| 301b | DOWN | |
| 301c | RIGHT | |
| 301d | LEFT | |
| 301e | DISPLAY | Toggle display between numeric and alphanumeric. |
| 301f | STOP | Stops cassette; clears LEDs; cancels current movement and function. |
| 301g | EXIT | Terminate viewing and eject microfiche. |
| 301h | LOAD | Load microfiche and begin viewing; if fiche is already loaded, the bar code is re-read and the fiche is moved to home position. |
| 301i | CUE | Advance to next image in program; generate dual tone. |
| 301j | RUN | Activate sequential mode; enable cue key; enable inputs and outputs; activate numerical display mode. |
| 301k | FAST FORWARD | Move rapidly to next image. |
| 301m | RAPID REVIEW | Move rapidly to previous image. |

Each key is an SPST pushbutton switch. The keyboard also has a connector 302 (KJ1), which is connected to connector 127 (CJ1) on the CPU board; a connector 303 (KJ2) connected to connector 402 (DJ1) on the display board; and a connector 304 (KJ3) for connection to an auxiliary keypad 310 which may have to 64 keys, but is seen in FIG. 8A to have 16 keys in this embodiment.

In the main keypad, four of the keys, including keys 301i, 301j, 301k, and 301m, representing CUE, RUN, FFW, and REW, respectively, are provided with integral light-emitting diodes (LEDs) 307. The LEDs in the latter three keys indicate that the named function is being performed, i.e., that the viewer is in RUN, FFW, or REW mode. The CUE LED indicates that a CUE signal is being received, from a tape, a telephone line, an RS-232 line, a remote CUE switch, or the CUE key itself. The four LEDs 307 are connected between +5 VDC and C5-C8 by 220-ohm resistors 309. When a pin C5-C8 goes low, the LED conducts and lights up.

Two logic chips, a keyboard buffer 305 and a keyboard latch 306, are provided for detecting when a key has been pressed on either keypad and for maintaining the states of the LEDs.

The key on the main keypad are arranged in four rows and three columns. The keyboard buffer 305 has eight row pins R1-R8; each one of pins R1-R4 is connected to the three keys in a respective row on the keypad. Each pin R1-R4 is connected to +5 VDC by a 10 K resistor in a resistor assembly 308 (UR1). The pins are normally high. The keyboard latch has eight column pins C1-C8, three of these (C1-C3) corresponding to the keys in the three columns. When a key is pressed, a connection is made between one of pins R1–R4 on buffer 305 and one of pins C1–C3 on latch 306. Further pins D0–D7 on both the keyboard buffer and the keyboard latch are connected to the data bus.

A 60 Hz TTL keyboard interrupt signal is generated by the counter/timer controller 121 (CTC-A). Every third time the signal occurs, that is, every 1/20 second, the CPU generates all low inputs to the keyboard latch at D0–D7 for about 250 nsec, and a strobe signal at pin 11 then causes pins C1–C8 to go low. If any of the keys are then being pressed, a corresponding one of pins R1–R8 is grounded. A further strobe signal at pins 1 and 19 of the keyboard buffer transfers the low signal to one of pins D0–D7 of the keyboard buffer, whereupon the CPU detects it on the data bus. As will be discussed further below, the CPU records the identification of the key that was pressed in RAM 113, and subsequently carries out the function corresponding to the key that was pressed. The auxiliary keypad 310 is connected to the same pins C1–C8 and R1–R8 and is read in the same way.

The keyboard latch 306 is also used by the CPU logic to latch the state of the LED's 307. When a keyboard interrupt occurs, C1–C8 all go low momentarily, causing all four LED's to light. The duration of the interrupt is so brief, however, that the flicker of the LED's is not noticeable, and they are immediately returned by the CPU to their previous state.

The pins R1–R8 and C1–C8 can accommodate a full 8-by-8 auxiliary keypad, which may be connected to the connector 304 (KJ3). A 16-key auxiliary keypad 310 connected to pins R1–R4 and C1–C4 is shown in FIG. 8A.

Figure 7:
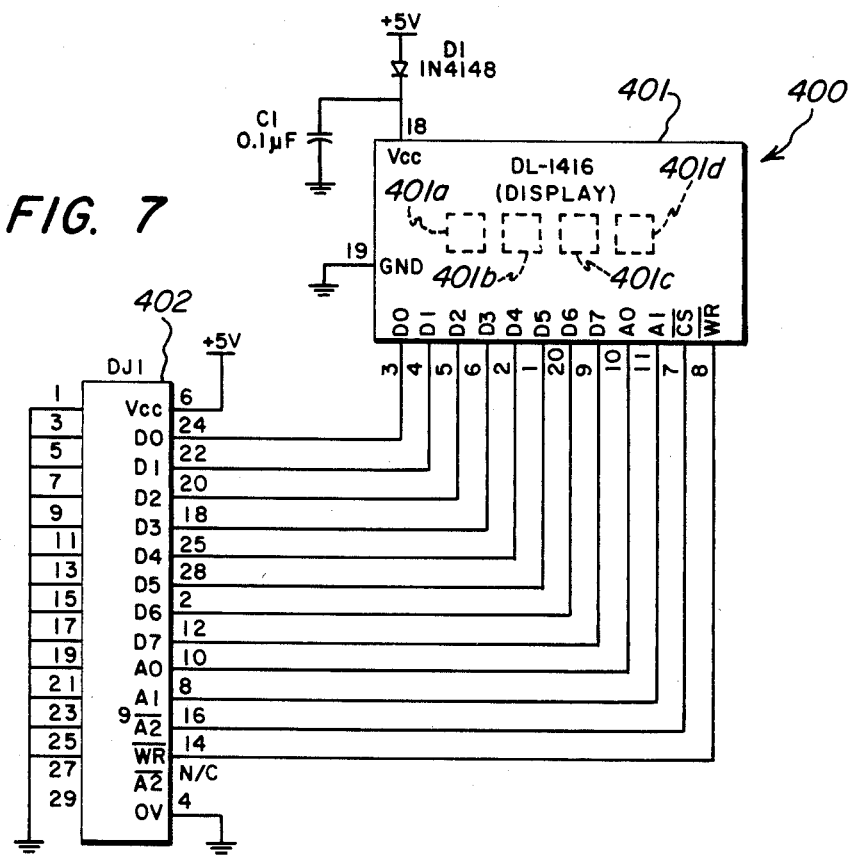
FIG. 7 is a schematic diagram of the alphanumeric display of the viewer.

The display board 400 is shown in FIG. 7. An alphanumeric display unit 401 (DL-1416) displays four characters 401 $a,b,c,d$, for displaying letters or numbers to indicate which of the images in the default sequence is being displayed (in sequential mode), or the row and column of a selected image presently being displayed (in either sequential or random mode). The display unit receives input from a connector 402 (DJ1), which is connected to connector 303 (KJ2) on the keyboard. By this means the display receives the 8 data bits from the data bus, indicating a frame or fiche image location; the three most significant bits from the address bus, to indicate that the display has been selected by the memory select decoder 109 to receive data (A2, $\overline{CS}$), and to select which character of the display is to be written to (A0,A1); and a write signal to update the visual output of the display. The display may also display error codes or any other desired messages from the CPU.

CPU Firmware

The CPU firmware is stored in the EPROM 112 and controls all functions of the viewer. The Appendix is a source listing of the program, which is hereby incorporated by reference into this specification.

The operation of the CPU is illustrated in the flow charts in FIGS. 9–23 and FIG. 33.

Figure 9:
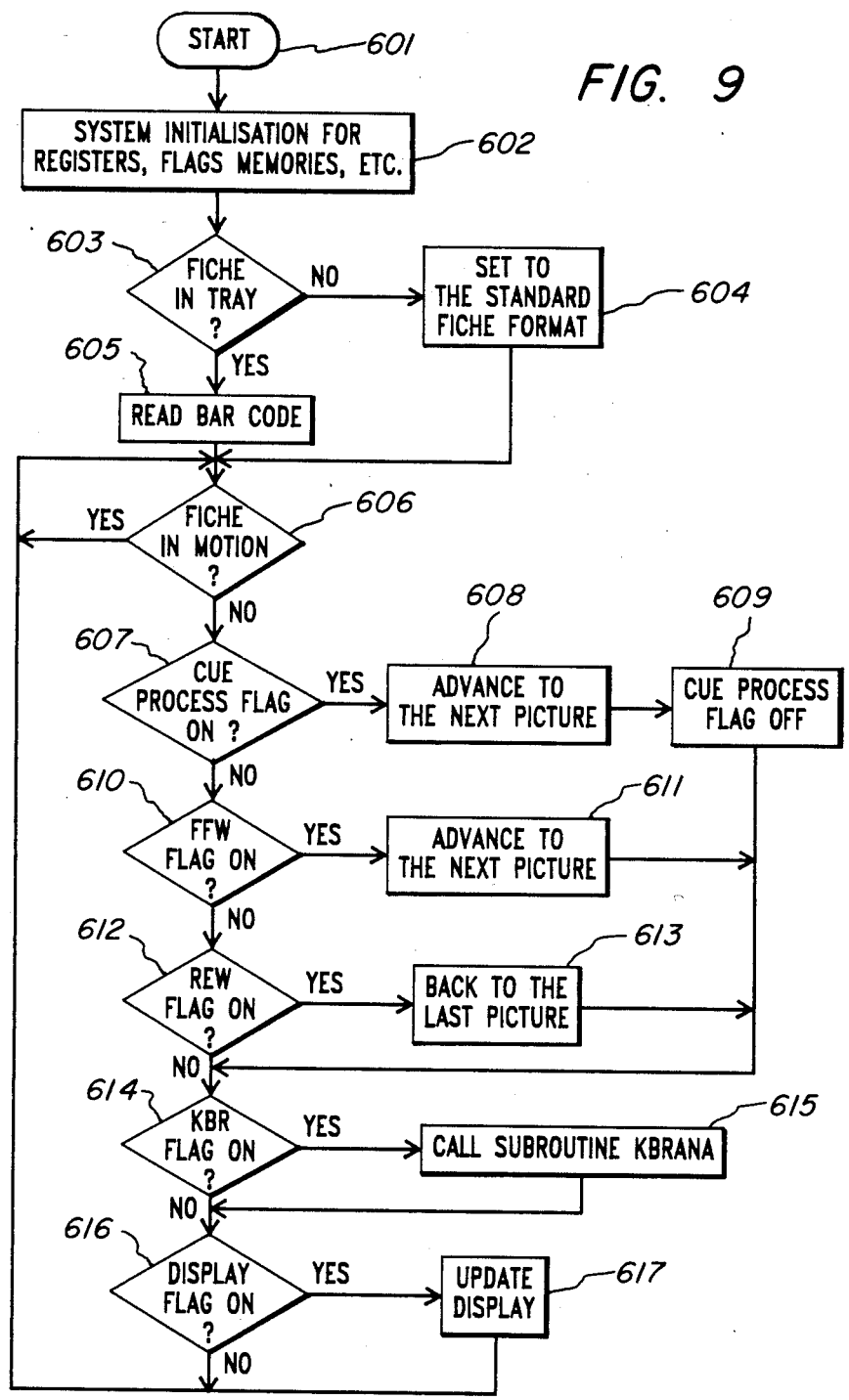

FIG. 9 begins with the start-up condition, represented by step 601, a start step, following power-on or a system reset. Step 602 provides for the initialization of registers, flags, memories, and so forth, of the system. At step 603 the X motor is moved slightly in one direction to detect whether there is a microfiche in the carrier table. Since the bar codes and column markers are transparent, while the rest of the header portion of the microfiche is opaque, a slight motion of the microfiche is sufficient to distinguish whether a mark is being detected or whether no fiche is present. If no fiche is present, then the system is set at step 604 to receive a mircofiche having the standard format pre-programmed in ROM. If a fiche is present, the entire header of the fiche, including the bar code, is read from beginning to end and the format parameters are stored in format registers in RAM. The fiche and bar code are read at step 605. The format parameters include the number and arrangement of the images and whether the microfiche contains any areas with non-standard format.

Step 606 in FIG. 9 is the beginning of a series of steps involving commencing or continuing motion of the microfiche. At step 606 the CPU determines whether the microfiche is in motion.

As will be discussed further below, operation of the motion-related controls sets a motion flag MVIFLG and initiates the appropriate motion of the microfiche. The motion flag MVIFLG must be set for any motion to occur. Referring to FIG. 33, at step 720, a motion interrupt to determine whether motion should continue is periodically generated by the counter/timer controller 121 (CTC-A). When this occurs, a register containing the current position of the microfiche is compared with a register containing the desired position of the microfiche. The comparison is made at step 721. If the desired position has not yet been reached, no action is taken. This decision is made on the basis of whether a column marker has been reached, step 722 requires that or whether an expected number of pulses from the X and Y motor sensors have been received. The expected number of pulses is deliberately overestimated in the case of motion in the X direction to allow for slippage of the rollers 551–554, so that a column marker will be reached before the expected pulse count is reached. If the requested position has been reached, then the motion flag is cleared at step 723 and all motion is stopped see step 724.

Returning to FIG. 9, at step 606, if motion has ended, the CPU then examines its flags to determine whether further functions are to be begun. A CUE PROCESS flag is set when a cue signal is received from a tape, from a telephone line, from an RS-232 line, from the CUE key on the main keyboard, or from an external cue switch. At step 607, if the CUE PROCESS flag is on, and if the CPU is otherwise prepared for motion, then the carriage table advances the fiche to the next image to be displayed, and the CUE PROCESS flag is turned off. These actions occur at steps 608 and 609, respectively. At step 610, if the fast forward (FFW) flag is on, the viewer advances to the next picture in the default sequence at medium speed. Movement in advance at medium speed occurs at step 611. At step 612, if the rapid review (REW) flag is on, the viewer moves to the previous image at medium speed. Return movement to the previous image at medium speed occurs at step 613.

Following these operations, at step 614, the CPU determines whether a key has been pressed. As discussed previously, the keyboard is polled when a keyboard interrupt is generated by the CTC-A 121, and if any key on the keypad has been pressed a low state appears on the data bus. When this occurs, a value that corresponds to the key that was pressed is stored in RAM under a label KBRDATA. At step 614, if the keyboard flag is on, then the keyboard subroutine KBRANA, see step 615, is executed. This operation will be considered further during the discussion directed to FIG. 11. At step 616, if the display flag is on, then the display is updated at step 617 and the CPU awaits further instructions.

Figure 10:
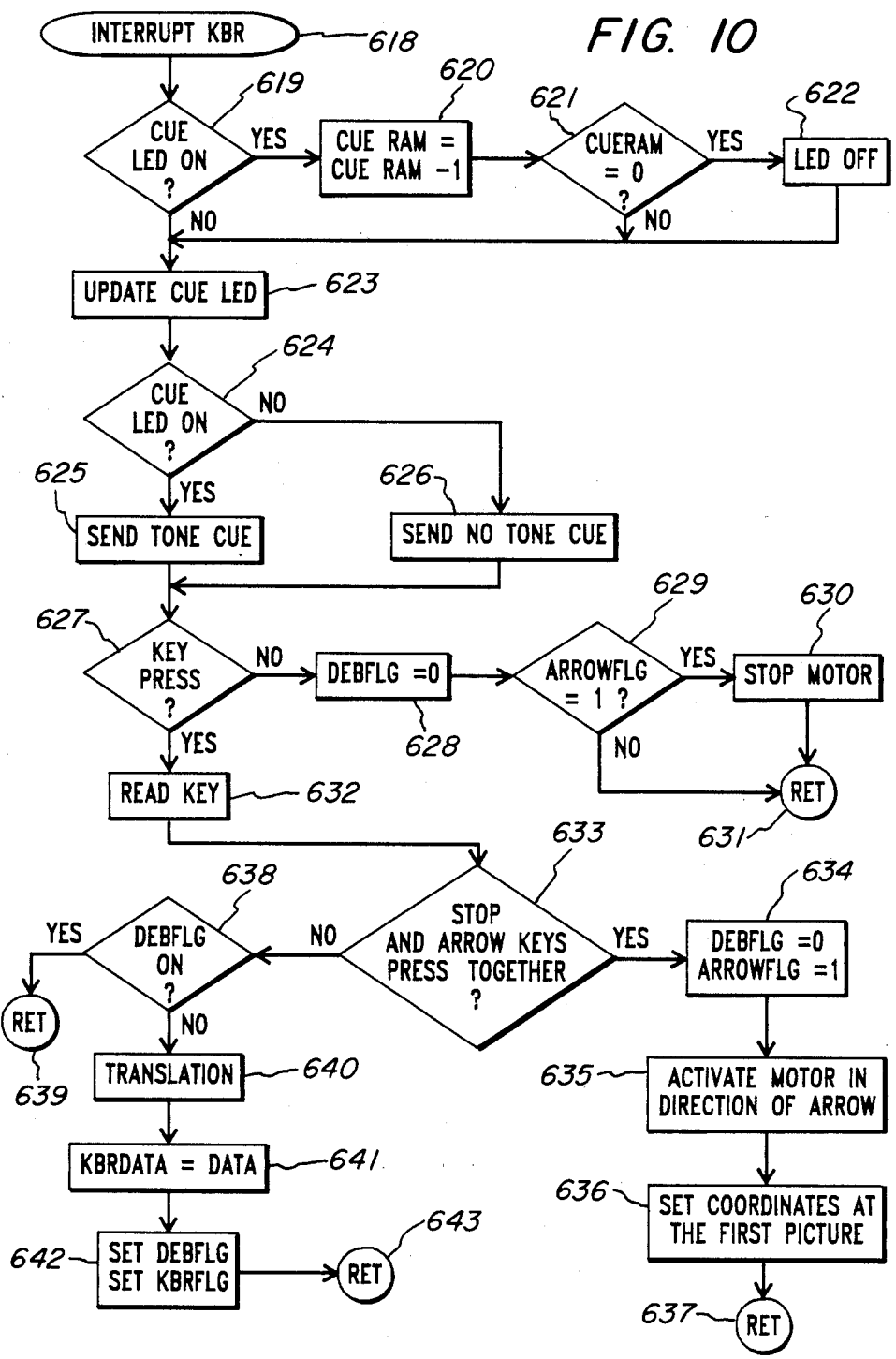

The keyboard interrupt procedure is set forth in greater detail in FIG. 10. When a keyboard interrupt occurs, see step 618, then it is determined at step 619 whether the CUE LED is on or off. This determination indicates either that a cue signal is at that moment being received, or that the CUE key has been pressed. This condition also causes a cue signal flag CUEFLG to be set. If the CUE LED is on, then at step 620 a quantity CUERAM in RAM is decremented by one. CUERAM is initialized at a preselected value to provide for a desired duration for the CUE LED to remain on. For example, if the CUE LED were desired to remain on for one-half second, CUERAM would be set initially at 30, since the keyboard interrupt signal has a frequency of 60 Hz. At step 621, when CUERAM equals 0, the CUE LED is turned off, see step 622. A further determination whether the CUE LED is on is carried out at step 623. If the CUE LED is on, step 624, because CUERAM does not equal 0, then a dual-tone cue signal is generated. This cue signal may be used to cue another microfiche viewer, may be recorded on a cassette tape, or may not be used at all. The tone cue continues until the quantity CUE RAM reaches 0. The tone cue signal is generated at step 625. If the CUE LED is off, a condition sensed at step 626, no cue signal will be generated.

At step 627, if a key was pressed, then the identification KBRDATA of the key that was pressed is read at step 632. If the key pressed was not a combination of the STOP and a directional (arrow) key pressed at the same time, then it is determined at step 638 whether the debounce flag (DEBFLG) is on.

The debounce flag is a flag that is set the first time the pressing of a key is detected (step 642), and remains on until the key has been released (step 628), thus preventing multiple processing of a single keypress. This is the type of latching technique that is used to compensate for contact bounce is a switch; hence the designation "debounce". At step 638, if the DEBFLG is not on, then this keypress has not been previously detected or acted upon. At step 640, a table is consulted for the address in ROM of the subroutine invoked by the key that was pressed. This address is then substituted for KBRDATA at step 641. At step 642 the DEBFLG is set to show that the present keypress is being processed, and the KBRFLG is set to indicate that KBRDATA exists in RAM.

Referring again to FIG. 9, and to FIG. 11, at step 614 if the KBRFLG is on, then the keyboard analyze subroutine KBRANA, step 615 (680) is executed. At step 681, KBRDATA is read from the RAM. At step 682, the subroutine at the address in KBRDATA is read from RAM, and at step 683 the subroutine is executed. At step 684, the KBRFLG is reset and the display flag is set to initiate any necessary changes in the state of the display. It will be recalled at step 616 of FIG. 9, if the display flag is on, the display is updated and the CPU waits for further instructions.

Referring again to FIG. 10, at step 638 if a keypress is detected but the DEBFLG is on, then the keypress is ignored because it is already being processed. When a keypress is no longer detected, at step 627, then the DEBFLG is reset to 0, step 628. The CPU then tests an arrow flat, step 629, which is set if the directional keys are being employed. If the arrow flag is set, this indicates that a directional key was depressed and has now been released. The motor is stopped, step 630 and the keyboard interrupt is ended.

Referring again to step 633, a combination of the stop key and the directional keys is utilized to load a microfiche that has no bar code or has an unknown format and make fine adjustments of its position with the directional keys to center the first image properly. Thus, the DEBFLG is reset, the arrow flag is set, step 634, and at step 635 fine movements are made in the desired direction. At step 636 the position registers of the RAM are set to indicate that the first image of the microfiche is being displayed.

FIGS. 12-15 show the subroutines that are executed in response to the directional arrows. The UP subroutine, beginning at step 644 is shown in FIG. 12. The brightness is set to high, step 645, because this mode of operation is intended for searching or rapid access for display of a particular desired image. The Y coordinate is decremented at step 646, i.e., the carrier table is to be moved toward the rear of the microfiche viewer, thus reducing the value of the Y coordinate, returning to the top or home row. The revised value of the Y coordinate is first tested, step 647, to determine whether it has dropped below 0; in an 8-bit register the value just below 0 is 256. If so, then the Y coordinate is set to 0, step 651, and up motion is ended. If the coordinate is not below 0, then the rapid access speed is selected, step 648, and at step 649 both the movement flat is set, the directional flag which determines the direction of motion of the Y motor is reset, and motion continues for as long as the keypress at step 627 is detected.

The subroutine beginning at step 653 responsive to the DOWN directional key is illustrated in FIG. 13. The operations at steps 654, 655, 656, 657, 658 and 660 are generally analogous to the previous discussion of the UP function, except that rather than testing for a zero coordinate, at step 656, the test is to see whether the next Y coordinate will exceed the preset maximum Y coordinate according to the format of the microfiche.

Figures 14, 15:
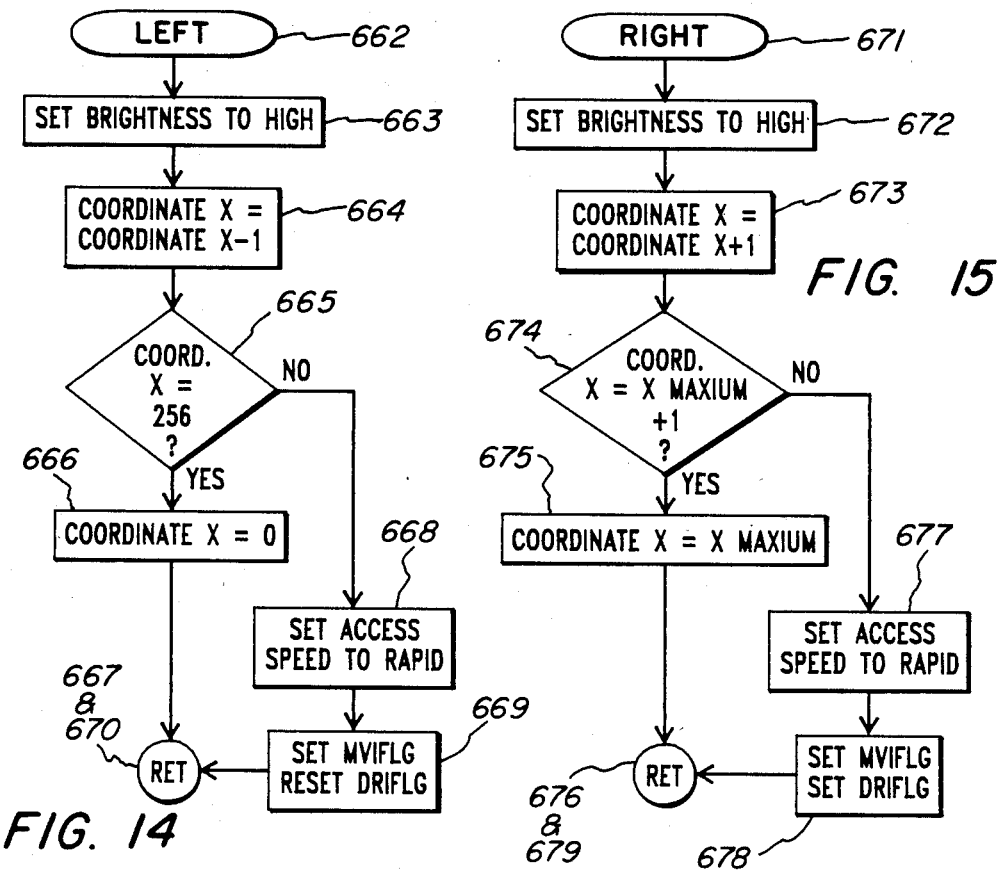

The LEFT and RIGHT subroutines, steps 662 and 671, respectively, are illustrated in FIGS. 14 and 15, respectively. They are generally analogous to the UP and DOWN functions. Thus, the functions of steps 663 (672), 664 (673), 665 (674) 666 (675), 668 (677) and 669 (678) follow generally the function described in connection with the discussion of FIGS. 12 and 13.

Figure 16:
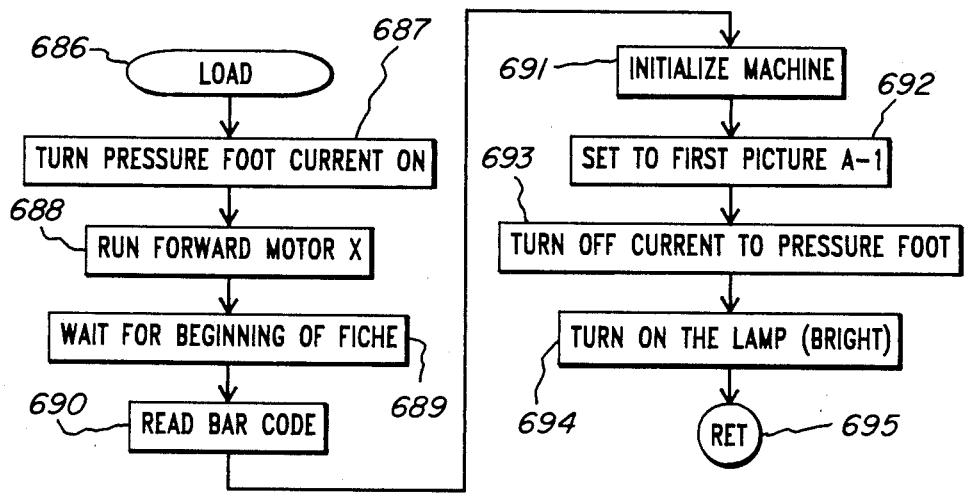

The LOAD subroutine of step 686 is shown in FIG. 16. At step 687 the pressure foot current is turned on to raise the pressure foot 569, in order to provide clearance between the pressure foot and the platen 578 for entry of the fiche. The X motor is run until the opaque header 512 is sensed by the bar code sensor 574, steps 688, 689 and 690. At the point, reading of the header begins and any transparent sections, that is, bar code or column markers, are detected. At step 691 the format information derived from the bar code, such as the number of rows and columns and whether any nonstandard-format areas are present, is entered into format registers.

The microfiche is then moved to its leftmost and rearmost position so as to display image A-1, the pressure foot is lowered, and the lamp is turned on and set to its bright setting, steps 692, 693 and 694.

Figure 17:
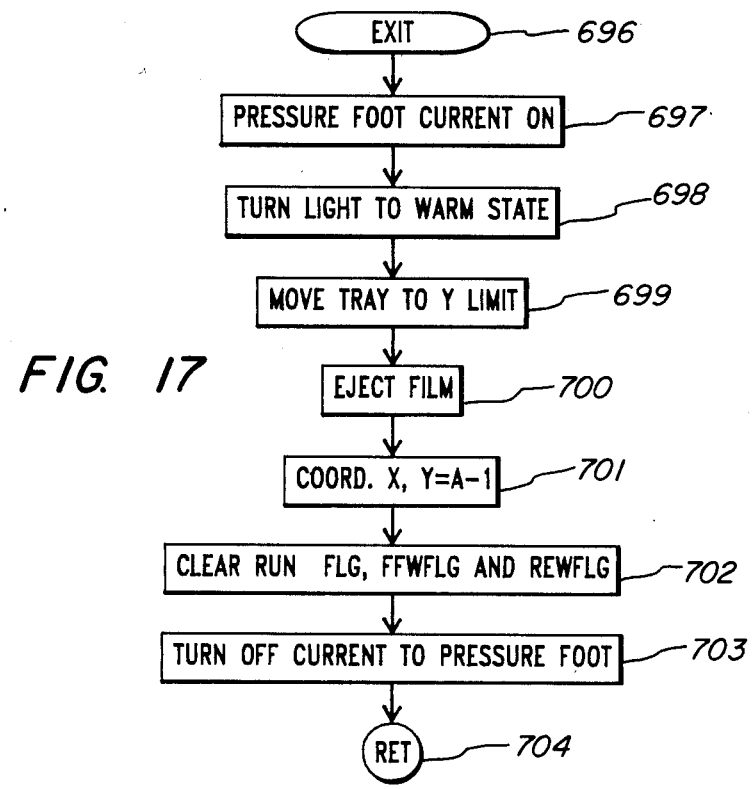

FIG. 17 shows the EXIT subroutine of step 696. The pressure foot is raised, step 697, the light is turned from its bright setting to its warm state, step 698, the carrier table is moved to the rearmost Y limit, step 699, the fiche is ejected, step 700, the carrier table is moved back to position A-1, step 701, all flags are cleared and LEDs extinguished, step 702, and the pressure foot is lowered, step 703.

Figure 18:
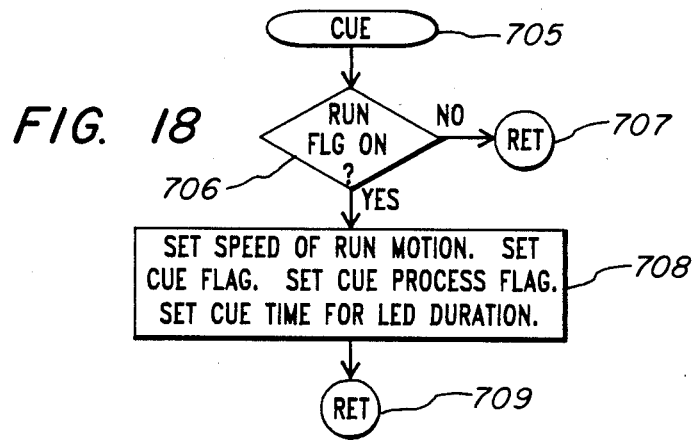

In the CUE subroutine, step 705, as seen in FIG. 18, the RUNFLG is first tested to determined whether the RUN key has been pressured. The test determination is carried out at step 706. If no RUN key has been depressed, the CUE key is ignored. If the RUNFLG is set, then, the motor speed is set, the CUEFLG which controls the CUE LED is set, and the CUE PROCESS flag is set to initiate motion at step 607 in FIG. 9. The cue time is also set to determine LED and cue tone duration at steps 619–626 in FIG. 10.

Figure 19:
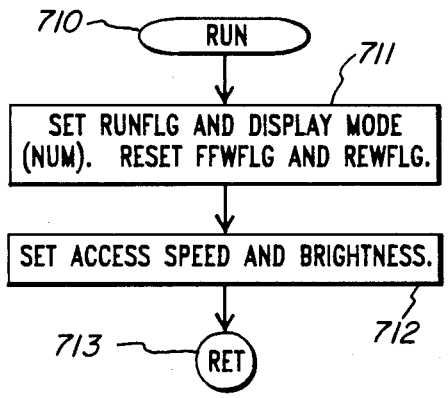

FIG. 19 illustrates the various steps following step 710 comprising pressing the RUN key. Thus, according to step 711, when the RUN key is pressed, the RUNFLG is set, to activate the sequential mode. The display is set to display numerical data, and both the fast forward and rapid review flags are reset. Then, according to step 712, the motor speed is set for sequential display, and the lamp is set to its bright condition.

Figure 20:
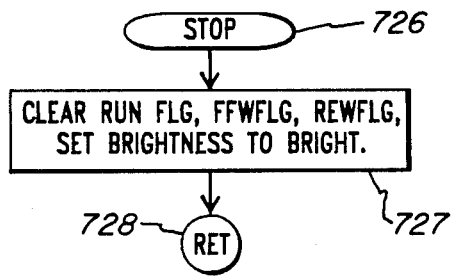

In FIG. 20, the STOP key at step 726 clears all movement flags and sets the lamp to bright, to stop the carriage table where it is and display the current image. These functions are illustrated by step 727.

Figure 21:
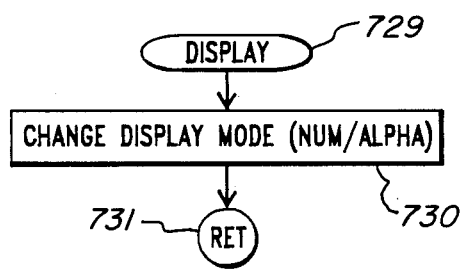
Figure 22:
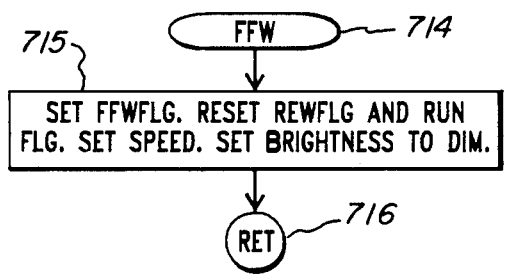
Figure 23:
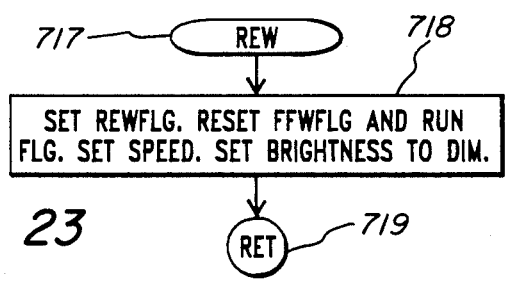

FIGS. 21, 22, and 23 show the operation of the steps 729, 714 and 717, represented by pushing the DISPLAY, Fast Forward (FFW), and Rapid Review (REW) keys. The function of each key, which has been described previously in connection with the discussion directed to Table II, is set out as steps 730, 715 and 718, respectively.

Steps 631, 637, for example, identified in FIG. 10 and other Figures as RET represent system resets.

MECHANICAL DESCRIPTION

Figure 24:
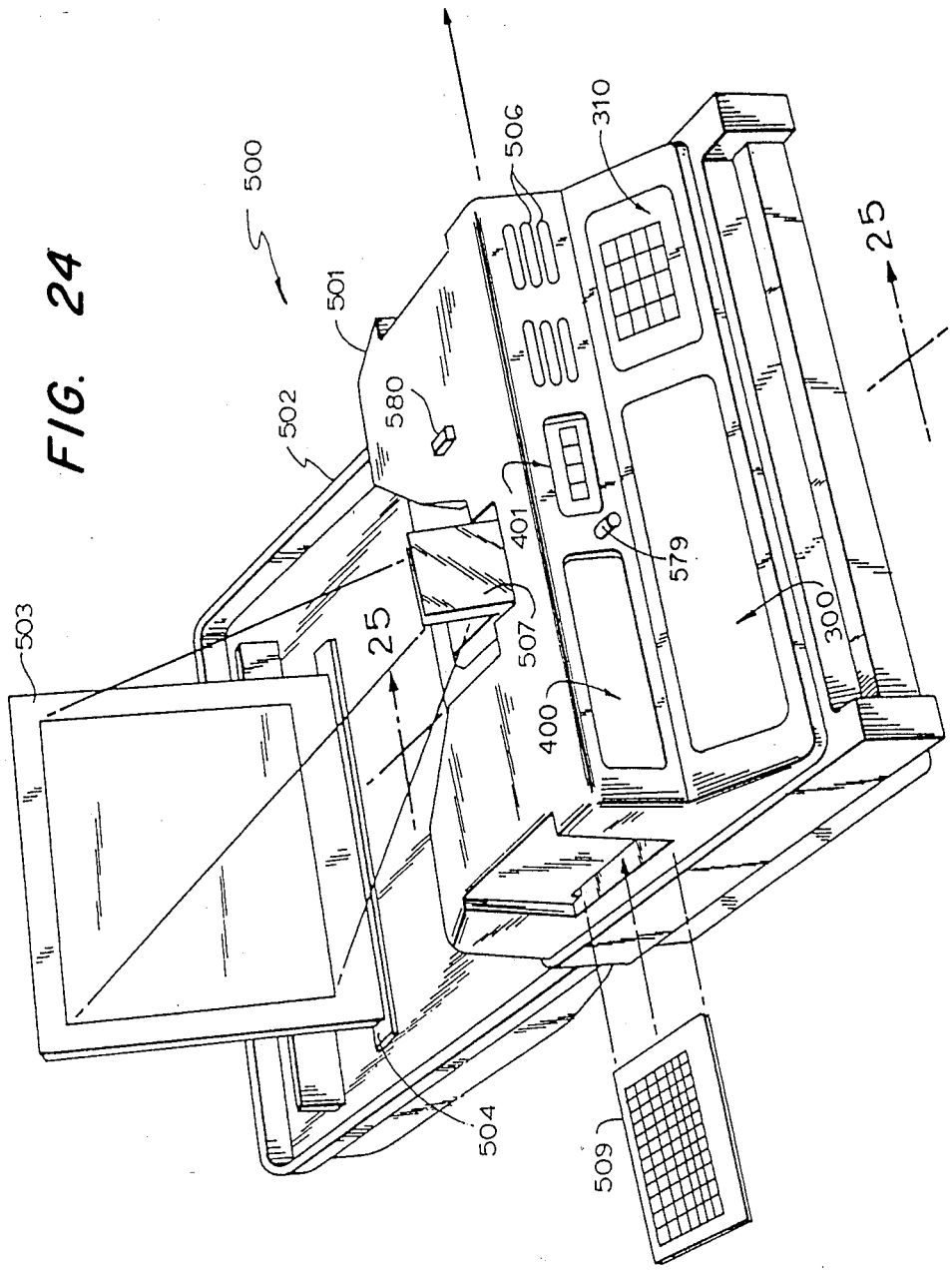
FIG. 24 is a perspective view of the microfiche viewer.

Mechanical aspects of the viewer are shown in FIGS. 24-30. Referring to FIG. 24, the viewer 500 comprises a case 501 and a cover 502. A screen 503 is supported on a screen mount 504. The screen may be hinged to the screen mount either permanently or removably, and may be stored within the cover when not in use. As alternatives to the projection screen system shown, a rear-projection screen or hood may be provided. Also, the screen may be integral with the underside of the cover, and the cover adapted to stand upright.

Also seen in FIG. 24 are the keyboard 300, the alphanumeric keypad 310, sound outlet holes 506, and the display 401. Additional features shown are a mirror cover 507, which forms part of the top of the cover 502. The mirror cover 507 conceals and protects the mirror and lens assembly (523, 524, 537) when it is in its closed position. The mirror and lens assembly perhaps may be best seen in FIG. 26. It is hinged so that in its open position it is angled toward the rear of the viewer at approximately at 50° angle from the horizontal, the mirror 537 being at the same angle, for rearward projection toward the screen.

The cover 502 also has a horizontal entry slot 508 it its left side (as viewed from the front keyboard area) for receiving a microfiche ("fiche") 509 for viewing, and an exit slot (not shown) in its right side for exit of the fiche after viewing.

Figure 30:
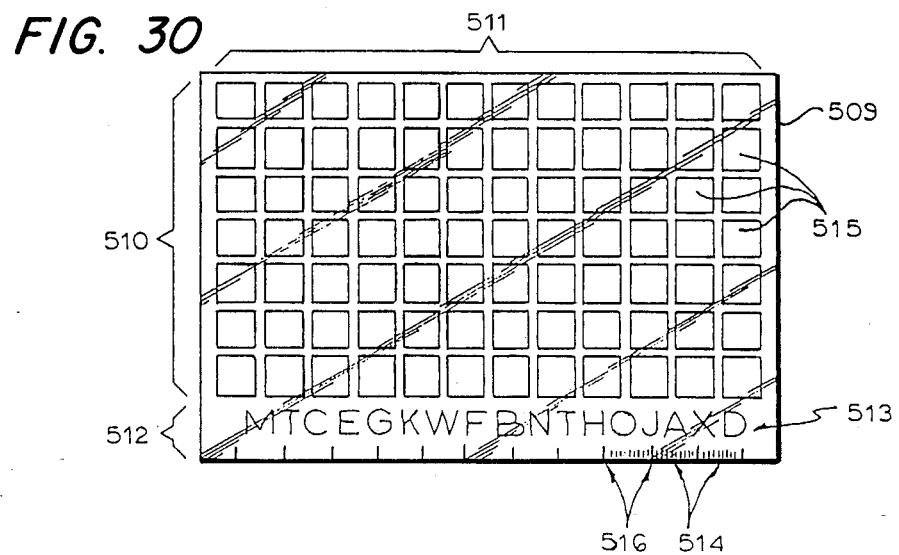
FIG. 30 is a rear view of a microfiche adapted for use with the viewer.
Figure 31:
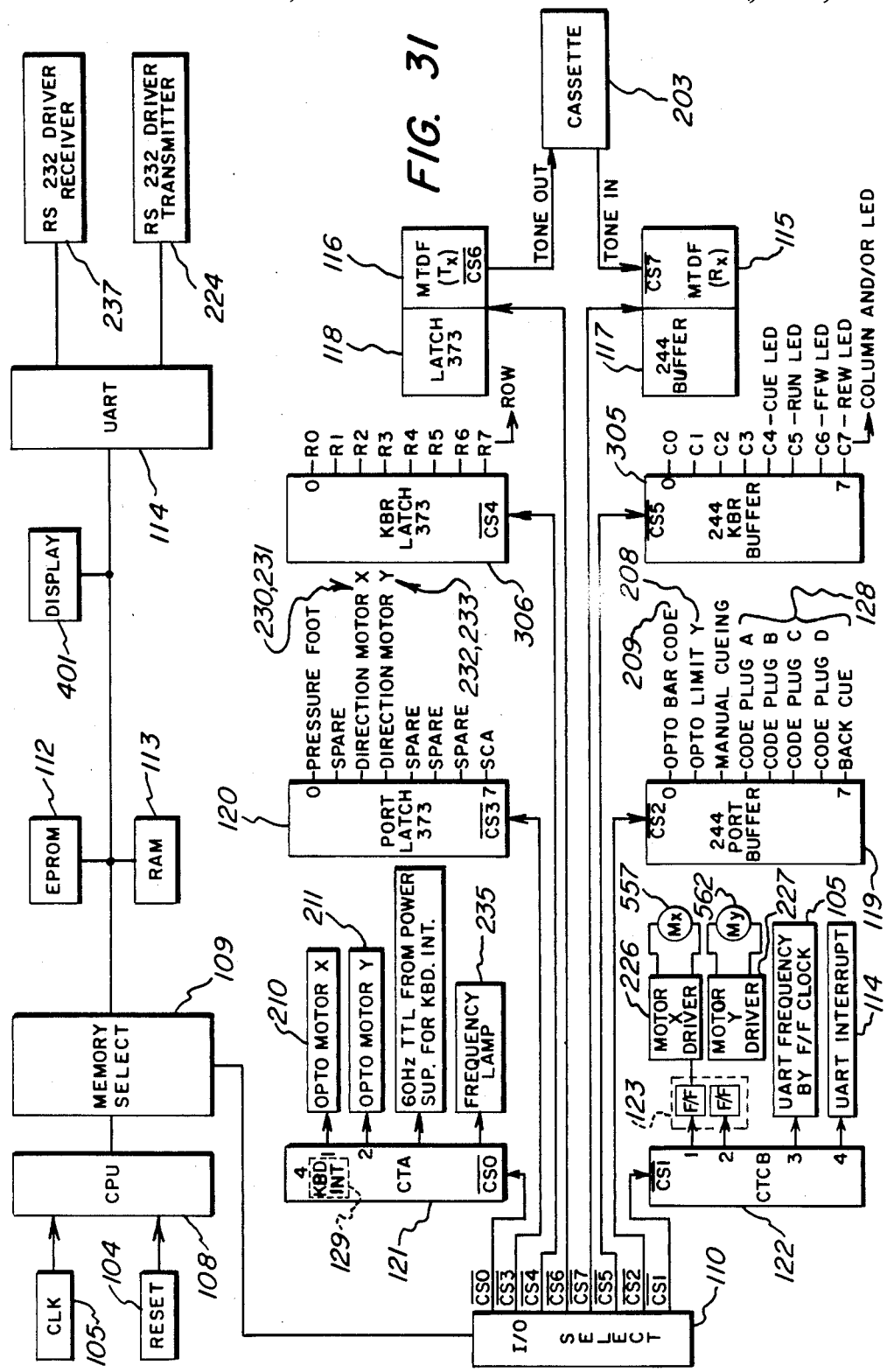
FIG. 31 is a block diagram of the circuitry of the viewer.

As seen in FIGS. 24 and 30, the fiche 509 has a plurality of photographic images 515 arranged in a field comprising rows 510 and columns 511. There may be seven rows and 12 columns, as shown, or any other arrangement. The only limitations on fiche format are that the fiche should be an appropriate size to be accommodated in the viewer, for example the standard 105 mm × 148 mm size, and the image size should be such that the optical system of the viewer is capable of producing a legible projected image.

The fiche also has a header 512, containing identifying text 513, a bar code 514, and column markers 516, which are photographically printed on the fiche. The bar code 514 contains information representing the size and arrangement of the images 515. The header is typically ½-to-⅝-inch high, and the text is about ⅜-inch high. As seen in FIG. 30, the bar-coded information is interspersed between the column markers. One or more segments of bar code information may be required, depending on whether the microfiche format is simple or complex. The arrangement of the images 515 need not be a uniform arrangement of rows and columns or even of uniform image size, so long as the arrangement is identified by the bar code and the bar code corresponds to data programmed in the EPROM 112 to guide the fiche automatically into position for viewing the images. The bar code may be eliminated if the fiche conforms to a standard format that has been pre-programmed into the EPROM. Each column marker is close to the center of one of the columns 511 and is used for positioning the fiche for viewing an image in that column.

Figure 25:
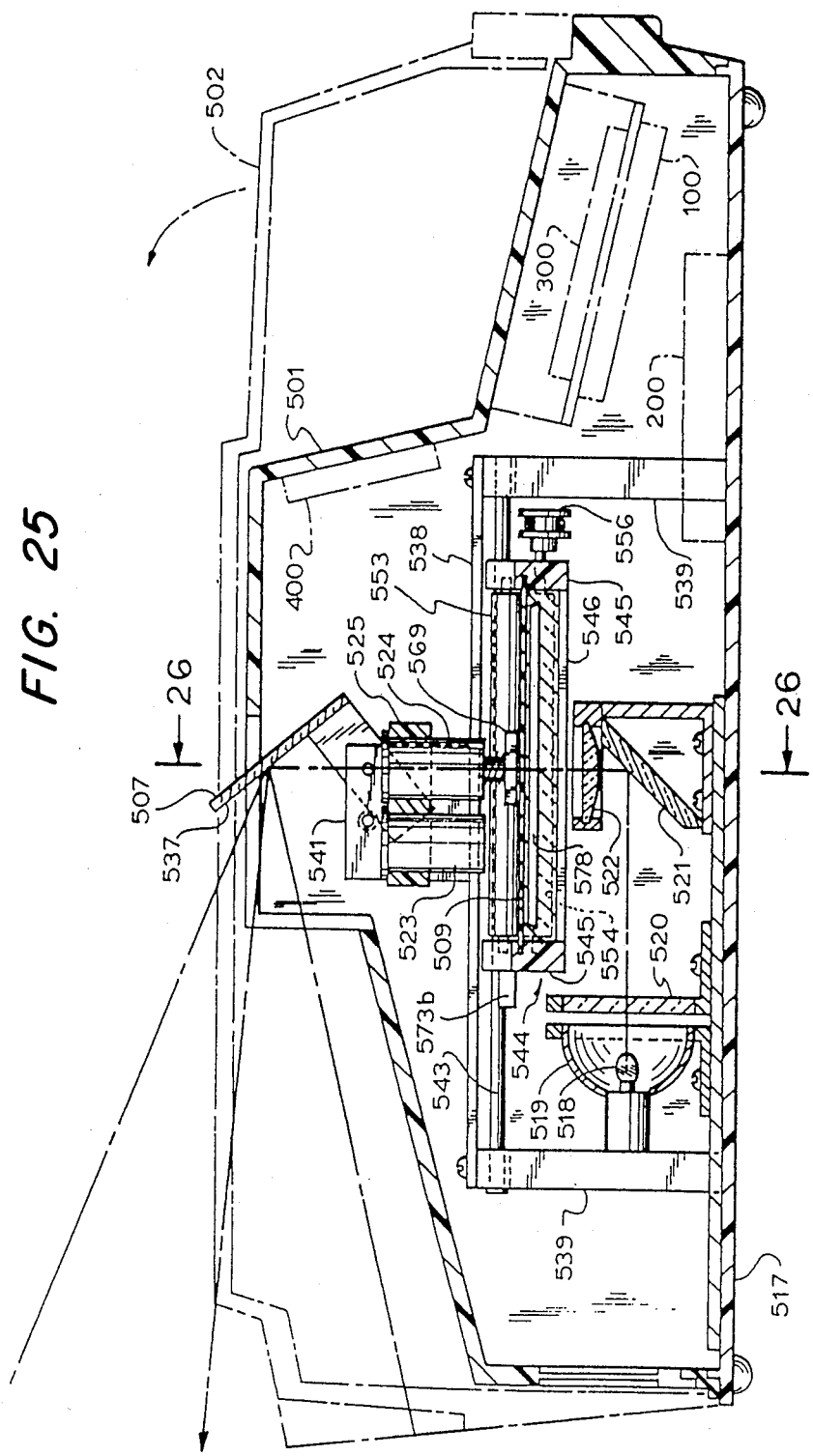
FIG. 25 is a cross-sectional elevation of the viewer.

FIG. 25 is a cross-sectional elevation of the viewer. The case 501 is closed at its bottom by a base plate 517. The cover 502 is supported at its rear on the base plate, either separably or non-separably, and at its front on the case 501. The power supply board 200 shown in phantom in an illustrative position mounted on the base plate 517. The CPU board 100, keyboard 300, and display board 400 are shown in phantom mounted in illustrative positions on the case 501. The base plate and associated structural components may also be formed as an integral molded unit.

Figure 29:
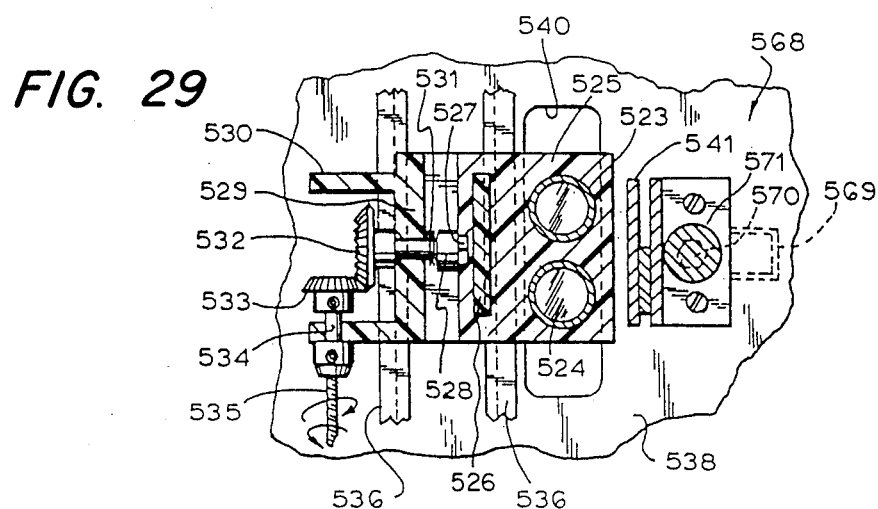

The optical system of the viewer includes a lamp 518 near the rear of the viewer whose output is directed by a reflector 519 through a heat-absorbing glass 520 toward the front of the viewer. The light is reflected upward by a lower mirror 521 through a plano-convex lens 522 and illuminates an image 515 on the fiche. The illuminated image is then magnified by a projection lens. As shown in FIGS. 25 and 29, the optical system includes a first projection lens 523 toward the rear of the viewer and a second projection lens 524 toward the front. Additional lenses may be provided to permit additional microfilm formats to be viewed. The projection lenses are mounted in a horizontal rectangular turret 525. In order to focus the lenses on the microfiche image, the turret is moved up and down on a vertical track member 526 which closely engages a hole in the turret. The turret and lenses may be moved for focusing by any convenient means, manual or automatic. In this embodiment, the turret 525 is moved up and down by an eccentric pin 527, which engages a side of the turret. The pin 527 projects from face of a rotating disk 528. The disk 528 is rotated by a shaft 529 which is journalled for rotation in a lens carriage 530 integral with the vertical track 526. A spring 531 is provided to urge the disk 528 away from the lens carriage 530 and toward the turret 525. The shaft 529 is driven by two engaged bevel gears 532 and 533 and a shaft 534 which in turn is linked to a flexible shaft 535. The flexible shaft 535 is rotated by a knob 579 on the front of the viewer, or any other convenient mechanical means, such as an autofocus mechanism.

In order to select the appropriate lens for the images to be viewed, the entire lens carriage 530 is slidable in a front-to-rear direction on tracks 536. The carriage is moved in such direction by any convenient manual or automatic means. As shown, a know 580, see FIG. 24, is linked to the lens carriage. Alternatively, automatic motorized means may be provided to select a lens in response to signals from the CPU.

The microfiche image is projected upward by the lenses 523,524 and reflected rearward by an upper mirror 537, which is mounted on the mirror cover 507.

The tracks 536 which support the lens carriage 530 are mounted on a platform 538. The platform is supported above the base plate 517 by four supports 539. A rectangular lens opening 540 is formed in the platform 538 so that the lower ends of the lenses 523,524 may extend below the platform 538 if it is necessary to lower the turret to achieve a good focus.

The mirror cover 507 is pivotally mounted on a flange 541, which is attached to the top side of the platform 538. In closed position the mirror cover 507 is set into the top of the case 501, and in open position the mirror 537, which is mounted on the underside of the mirror cover 507, is angled to direct the projected microfiche image rearward toward the screen 503 at approximately an angle of 50°.

Two parallel rods 542 and 543 extend from front to rear of the viewer. Each rod is mounted between two of the supports 539 and below the platform 538. A microfiche carrier table 544 is supported on the rods 542, 543 and is movable thereon from front to rear. The carrier table 544 consists of two side rails 545 which extend transversely of the viewer and a rectangular carrier base 546 between the lower portions of the rails 545. Each of the side rails has two holes 547 and 548 to accommodate the rods 542 and 543, respectively. The holes 547 closely accommodate the rod 542 to guide the carrier table in its front-to-back motion. The holes 548 are slightly elongated in the horizontal direction, so as to support the carrier table but to avoid binding as the table moves if the rods are slightly out of parallelism.

Alternatively, the rods may be integrally mounted on the underside of the platform 538, with the supports 539 being connected to the platform rather than to the rods. The advantage of such an arrangement is that the entire optical unit consisting of the carrier table, platform lens turret, and focusing mechanism remains permanently in alignment.

Figure 26:
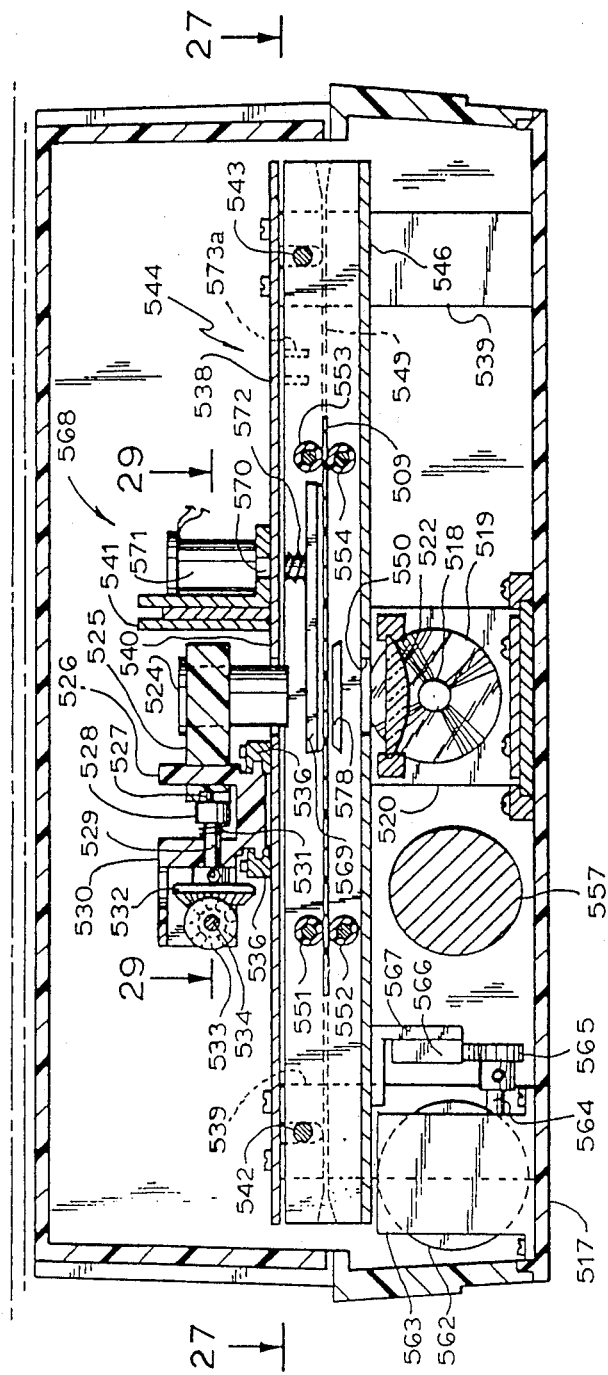
FIG. 26 is a cross-sectional elevation taken along line 26—26 of FIG. 25.

The inner surface of each of the side rails 545 of the carrier table 544 has a longitudinal groove 549, see FIG. 26, along its full length and approximately in the plane of focus of the lenses. The grooves are sized to receive a microfiche inserted into the groove at one end of the table and guide it through the full length of the grooves, to be removed at the other end of the table. The grooves may be enlarged at each end to facilitate insertion and removal of the microfiche.

The carrier base a rectangular opening 550 across substantially its entire width and centered between its ends. With appropriate front-back movement of the carrier table 544, the opening 550 allows for the passage of light between the lens 522 and the lenses 523, 524 through any image 515 in any row 510 on a fiche 509 positioned in the grooves 549.

First and second pairs of rollers extend between the side rails 545 for moving a microfiche from left to right through the grooves 549 in the carrier table. The first pair is to the left of the opening 550, and consists of an upper roller 551 and a lower roller 552 having surfaces of rubber or the like. The second pair of upper and lower rollers 553 and 554 is similar to the first pair and is located to the right of the opening 550. Each roller pair makes rolling contact in the plane of the grooves 549. Each roller has axles on both ends that are jounalled for rotation in holes in the side rails 545. The upper rolls 551 and 553 rotate passively, while the axles of the lower rollers 552 and 554 each have extension shafts extending through the front side rail 545, on which are mounted drive pulleys 555 and 556, respectively. Idler rollers may be provided at the ends of the carrier table to facilitate entry and exit of the microfiche.

Motive power for the drive pulleys 555 and 556, to move a fiche right and left, i.e. in the X-direction, is generated by the X-axis drive motor 557, which is hung from the bottom of the carrier base 546 by a flange 558. A main drive pulley 559 is mounted on the output shaft of the X-axis drive motor. The pulleys 555, 556, 559 are linked by a drive belt 560. A passive pulley 561 is provided between the main drive pulley and the front rail 545 to increase the contact between the belt 560 and the drive pulleys 555 and 556, and also to increase the tension on the belt. The pulleys and belt are preferably ridged to improve the contact between them.

A fiche is moved front and rear, i.e. in the y-direction, by moving the entire carrier table 544. Motive power is generated by means of the y-axis drive motor 562 and its associated right-angle gearing 563. The output shaft 564 of the gearing 563 has a pinion 565, which engages a front-to-rear rack 566 on the underside of the carrier base 546.

The motors 557 and 562 have internal optical means 575, 576 for sensing their rotational speed. A disk with radial lines on one or both surfaces is mounted on and rotates with the drive shaft. A light source and photodetector are so oriented that the path of light between them is interrupted by the lines. By determining the rate of interruption the speed of the drive shaft can be determined.

Figure 27:
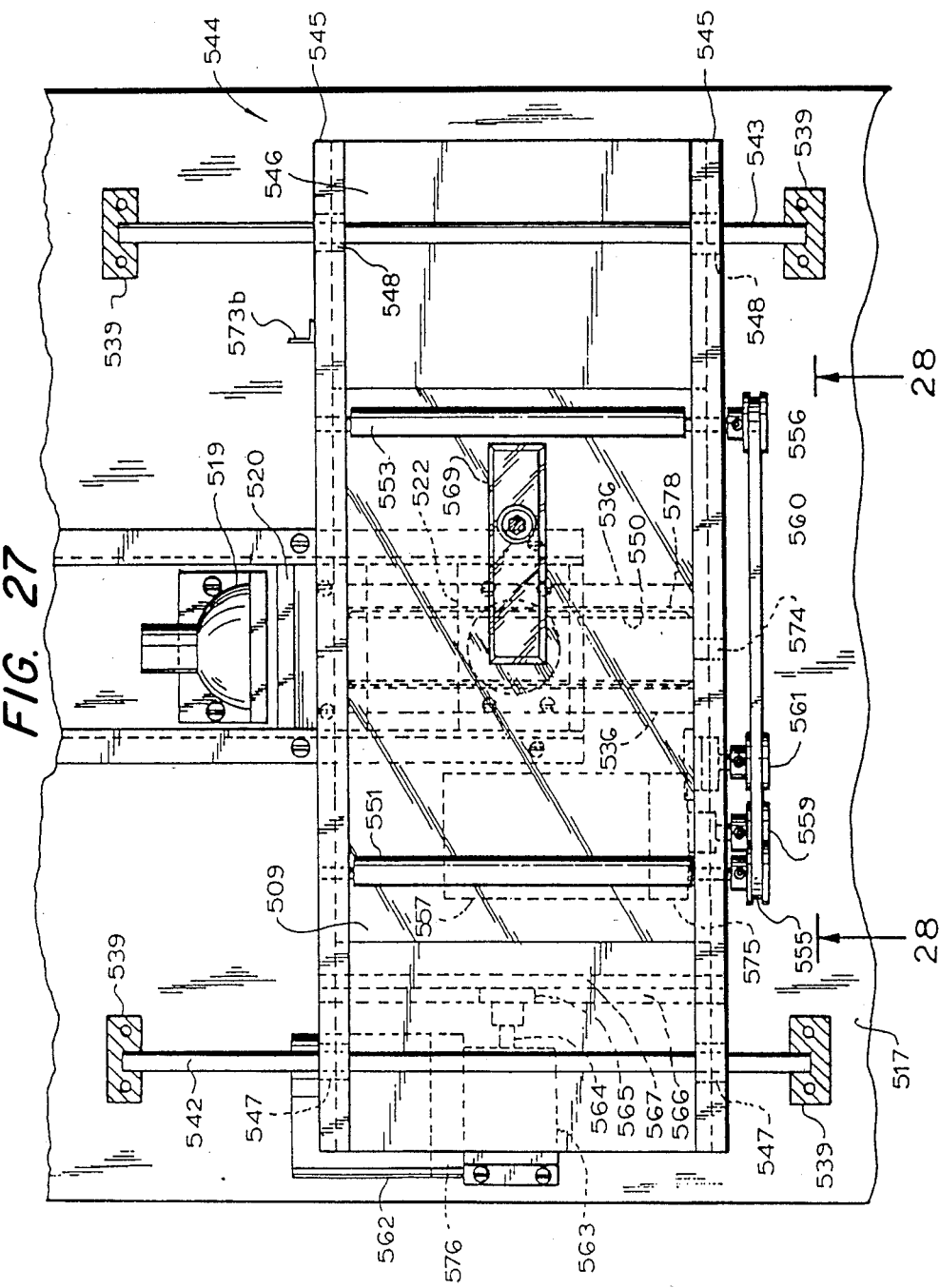
FIG. 27 is a cross-sectional top view taken along line 27—27 of FIG. 26.
Figure 28:
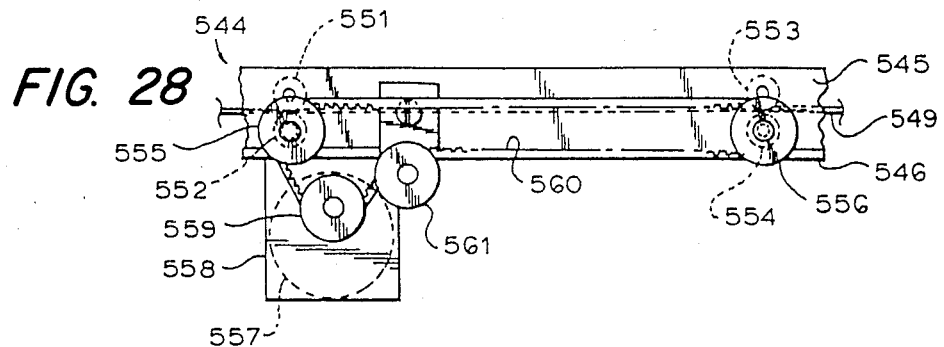
FIG. 28 is an elevation of part of the carriage table of the viewer taken along line 28—28 of FIG. 27.

The bar code sensor 574 is seen in FIG. 27. This is an optical switch of the type having an upper branch containing a downward directed GaAs infrared-emitting diode and a lower branch with an upward-facing silicon phototransistor sensor. Such switches are available from Clarex Electronics of Mount Vernon, N.U., and are designated the CLI-800 series. The sensor 574 is mounted in the inner side of side wall 545, bracketing the groove 549. Thus, opaque portions of the header block the passage of light between the two branches of the switch. The bar code area of the header is preferably a negative image, i.e., opaque except for the markings, for more convenient detection of the presence of a microfiche in the carrier table. (See step 603 in FIG. 9.)

A similar optical sensor 573a is mounted on the underside of the platform 538 near the rear. The sensor 573a corresponds to an ear 573b on the rear side rail 545, to detect when the carrier table is at the limit of its rearward travel in the Y-direction.

A pressure system 568 is provided to urge the fiche 509 in the groove 549 downward to the focal plane, which avoids any need for refocusing the lenses 523, 524. A rectangular transparent pressure foot 569, made of LEXAN ® or the like, and having bevelled lower edges, is disposed between the grooves 549 and the platform 538. It is oriented to extend from below the lens that is in the viewing position toward the right end of the carrier table 544 and parallel to the side rails. The pressure foot depends from the vertical armature 570 of a solenoid 571. The solenoid is mounted on top of the platform 538, and the armature extends through a hold in the platform. When the solenoid is not energized the pressure foot is urged downward by a spring 572. In this position, the pressure foot holds the selected image location of the fiche securely against a horizontal platen 578, which is located slightly below the grooves 549 and in the plane on which the lenses 523,524 are focused. The platen is a glass slide with bevelled upper edges located above substantially all of the image opening 550 in the carrier base 546. The pressure foot is transparent so that the fiche can be held in the focal plane directly below the lens without interfering with focusing or projection. When the solenoid is energized, the pressure foot is raised against the force of the spring and the fiche rises slightly above the platen, to permit the fiche to be moved without damage.

Although a preferred embodiment has been described herein, it is to be understood that the invention is not limited to such embodiment. Rather, it includes such variations and equivalents of the features shown and described, or portions thereof, as are possible within the spirit and scope of the invention, as defined in the following claims.

We claim:

1. A control system for controlling movements of a carrier for a microfiche having images arranged in substantially any format to position said microfiche and a selected image at a focal point of an optical system for display by the optical system of said selected image on such microfiche, said focal point is substantially fixed and said carrier is movable to any location with an X-Y coordinate system, and wherein the microfiche bears format data identifying placement of said selected image and including X-motor means for moving the carrier and microfiche in an X direction and Y-motor means for moving the carrier and microfiche in a Y direction, comprising:
   memory means for storing digital data representing predetermined patterns of X and Y movements,
   address input means for receiving digital, audio, and manual inputs and in response generating digital address data indicative of movements to be performed,
   format input means for reading the format data on the microfiche and generating in response digital format data indicative of movements to be performed,
   cue input means for receiving digital, audio, and manual cue inputs and in response generating digital cue signals for initiating movements,
   processing means for receiving digital signals and data from said memory means, address input means, format input means, and cue input means and generating analog signals to control said X and Y motor means and said optical system.

2. A system as in claim 1, including means for receiving such audio cue and audio address inputs from a telephone line.

3. A system as in claim 2, including means for receiving such audio cue and audio address inputs from a magnetic tape, and further comprising means for recording such audio cue and address inputs on such magnetic tape and means for transmitting such audio cue and audio address inputs on a telephone line.

4. A system as in claim 1, wherein said format input means includes for reading column markers and code markings in a header portion of such microfiche, such column markers indicating the locations of columns of images on such microfiche, and such code markings being located between two of such column markers and indicating formats of columns and rows in which images are arranged on such mircofiche.

5. A system as in claim 4, wherein such code markings are divided into at least two segments, each segment being located between two of said column markers.

6. A system as in claim 4, wherein such code markings further indicate the location of at least one image that is not arranged in such columns and rows on such microfiche.

7. A system as in claim 4, wherein such code markings indicate a format of images corresponding to a predetermined pattern of X and Y movements for which digital data are stored in said memory means.

8. A system as in claim 1 wherein:
   the analog signals generated by said processing means in response to digital cue signals from said cue input means corresponds to digital address data from said address input means when such digital address data are received by said processing means prior to receiving such digital cue signals, and
   the analog signals correspond to digital data from the memory means at times other than when such digital address data are received prior to receiving such digital cue signals.

9. A system as in claim 1, wherein said optical system includes lenses mounted in a movable turret, and said processing means generates analog signals to move such turret to select a desired lens in response to format data from said format input means.

10. A system as in claim 1, wherein said optical system includes a lamp and said processing means generates analog lamp signals to power such lamp, the lamp being relatively bright while images are being displayed and relatively dim during X and Y movements.

11. A system as in claim 10, wherein said processing means generate an analog lamp signal to maintain such lamp in a warm condition without generating substantial light at times other than when images are being displayed and other than when the microfiche is being moved.

12. A system as in claim 11, wherein said analog lamp signals are pulse signals, the frequency of such pulses determining the brightness of the lamp.

* * * * *

UNITED STATES PATENT AND TRADEMARK OFFICE
CERTIFICATE OF CORRECTION

PATENT NO. : 4,805,087

DATED : Feb. 14, 1989

INVENTOR(S) : Frankel et al.

It is certified that error appears in the above-identified patent and that said Letters Patent is hereby corrected as shown below:

Claim 1, line 7, "with" should read "within";

Claim 4, line 2, after "includes" insert --means--; and

Claim 11, line 2, "generate" should read "generates".

Signed and Sealed this

Twelfth Day of December, 1989

*Attest:*

JEFFREY M. SAMUELS

*Attesting Officer*     *Acting Commissioner of Patents and Trademarks*